US012222529B2

(12) United States Patent
Mori et al.

(10) Patent No.: US 12,222,529 B2
(45) Date of Patent: Feb. 11, 2025

(54) DISPLAY SWITCHING DEVICE, BUTTON DEVICE FOR GAME MACHINE, AND SWITCH

(71) Applicant: OMRON Corporation, Kyoto (JP)

(72) Inventors: Yuto Mori, Kyoto (JP); Masayuki Shinohara, Kyoto (JP); Gouo Kurata, Kyoto (JP); Hayato Yoshida, Kyoto (JP); Masao Mishina, Kyoto (JP)

(73) Assignee: OMRON Corporation, Kyoto (JP)

( * ) Notice: Subject to any disclaimer, the term of this patent is extended or adjusted under 35 U.S.C. 154(b) by 489 days.

(21) Appl. No.: 17/527,241

(22) Filed: Nov. 16, 2021

(65) Prior Publication Data
US 2022/0196893 A1   Jun. 23, 2022

(30) Foreign Application Priority Data
Dec. 22, 2020  (JP) .................. 2020-212776

(51) Int. Cl.
G02B 5/02      (2006.01)
G07F 17/32     (2006.01)
G02B 30/27     (2020.01)

(52) U.S. Cl.
CPC ....... *G02B 5/0278* (2013.01); *G07F 17/3206* (2013.01); *G07F 17/3209* (2013.01); *G07F 17/3211* (2013.01); *G02B 30/27* (2020.01)

(58) Field of Classification Search
CPC . G02B 5/00; G02B 5/02; G02B 5/021; G02B 5/003; G02B 5/0278; G02B 5/0045;
(Continued)

(56) References Cited

U.S. PATENT DOCUMENTS 6,023,277 A * 2/2000 Osaka ................ G06F 3/147
348/E13.043
6,295,104 B1 9/2001 Egawa et al.
(Continued)

FOREIGN PATENT DOCUMENTS

CN         1834755 A    9/2006
CN       102042554 A    5/2011
(Continued)

OTHER PUBLICATIONS

The Office Action (JPOA) issued on Sep. 17, 2024 in a counterpart Japanese patent application No. 2020-212776, with English translation.
(Continued)

*Primary Examiner* — Sultan Chowdhury
(74) *Attorney, Agent, or Firm* — METROLEX IP LAW GROUP, PLLC; Robert L. Scott, Esq.

(57) ABSTRACT

A display switching device according to one or more embodiments may display images by switching light illumination from multiple light source positions. The device may include a lens array including multiple lenses that allow passage of light from the light source positions, a display layer including pixel regions that allow passage of light collected on the lenses included in the lens array, and a diffusion layer located opposite to the light source positions with the lens array in between to diffuse passing light. The diffusion layer optically adheres to a layer adjacent to a surface of the diffusion layer nearer the light source positions, or the diffusion layer and the layer adjacent the surface of the diffusion layer nearer the light source positions include the same material.

19 Claims, 28 Drawing Sheets

(58) Field of Classification Search
CPC ........ G02B 30/00; G02B 30/22; G02B 30/27;
G02B 30/28; G02B 30/31; G02B 30/33;
G03B 3/00; G03B 3/006; G03B 3/0062;
G03B 3/0068; G07F 17/0014; G07F
17/3206; G07F 17/3209; G07F 17/3211;
G07F 17/3204
See application file for complete search history.

(56) References Cited

U.S. PATENT DOCUMENTS

| | | |
|---|---|---|
| 2003/0035220 A1 | 2/2003 | Hawver |
| 2006/0227323 A1 | 10/2006 | Goto |
| 2012/0147059 A1* | 6/2012 | Chen ................. H04N 13/32 345/102 |
| 2013/0155377 A1* | 6/2013 | Huang ............... H04N 13/359 353/7 |
| 2016/0306098 A1* | 10/2016 | Fujita ................ G02B 6/0036 |
| 2016/0335843 A1* | 11/2016 | Agata ................. H01H 13/83 |
| 2020/0159071 A1* | 5/2020 | Yoon ................ G02F 1/133504 |
| 2020/0359484 A1 | 11/2020 | Shinohara et al. |

FOREIGN PATENT DOCUMENTS

| | | |
|---|---|---|
| CN | 102788310 A | 11/2012 |
| CN | 111916001 A | 11/2020 |
| JP | 2003-100125 A | 4/2003 |
| JP | 2003-195216 A | 7/2003 |
| JP | 2005-266206 A | 9/2005 |
| JP | 2008-305587 A | 12/2008 |
| JP | 2020-184013 A | 11/2020 |
| WO | 2009041278 A1 | 4/2009 |

OTHER PUBLICATIONS

The Office Action (CNOA) issued on Jul. 2, 2024 in a counterpart Chinese patent application No. 202111312789.0, with English translation.

* cited by examiner

FIG. 1
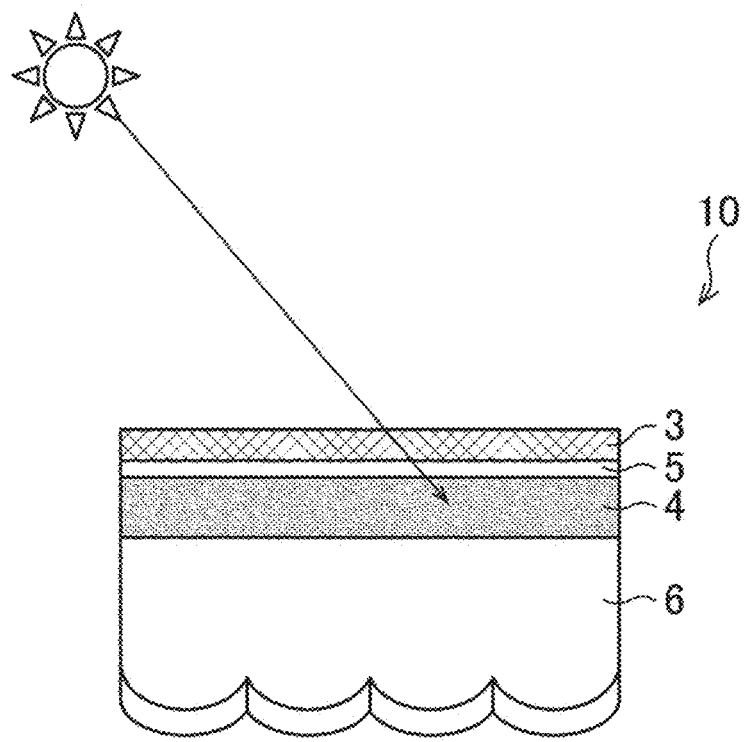
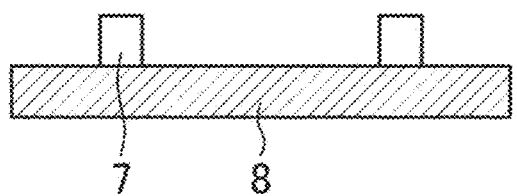

FIG. 2
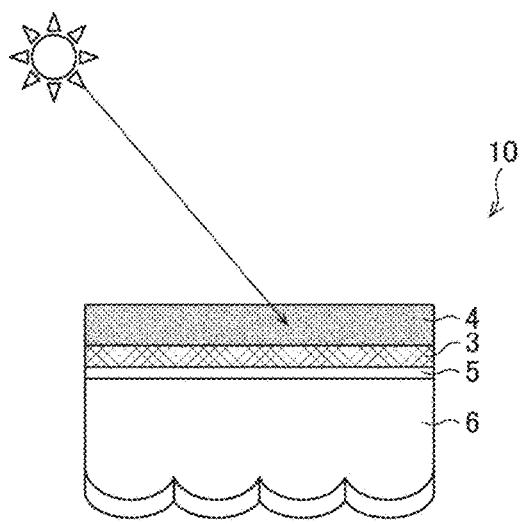
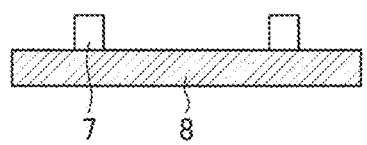
FIG. 3
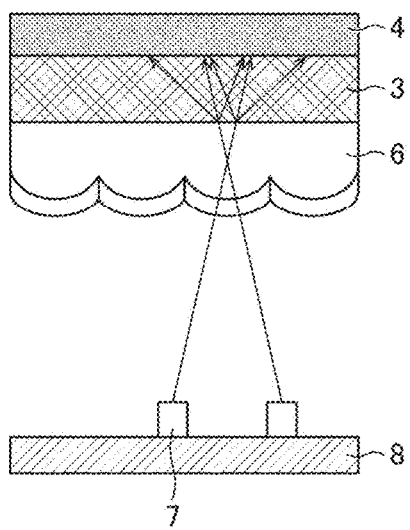

Intensity distribution on upper surface of diffusion layer

FIG. 11
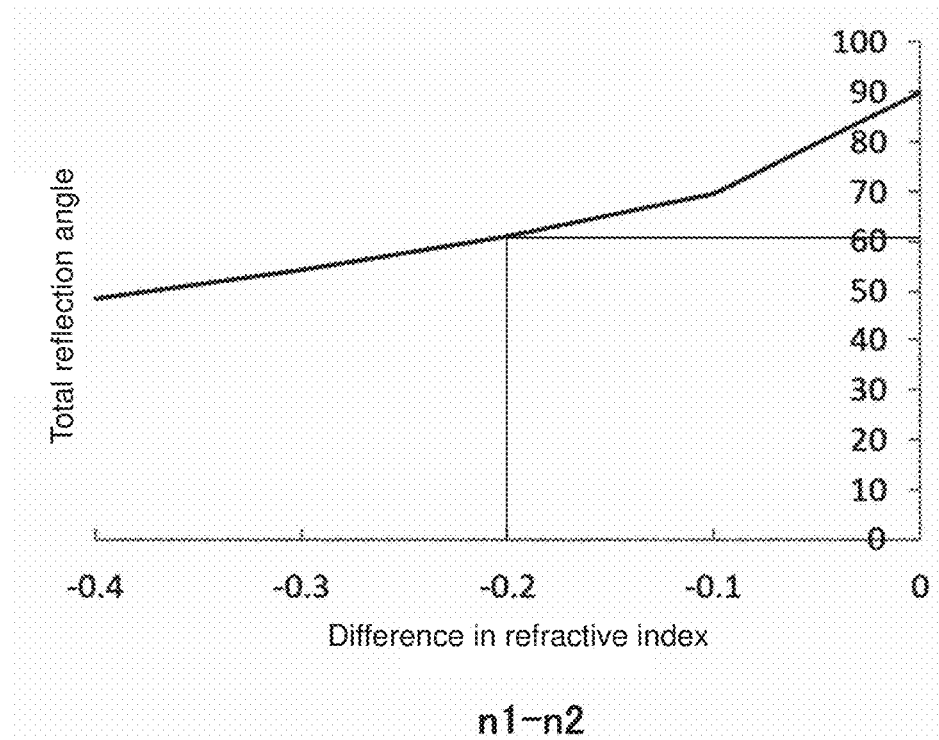
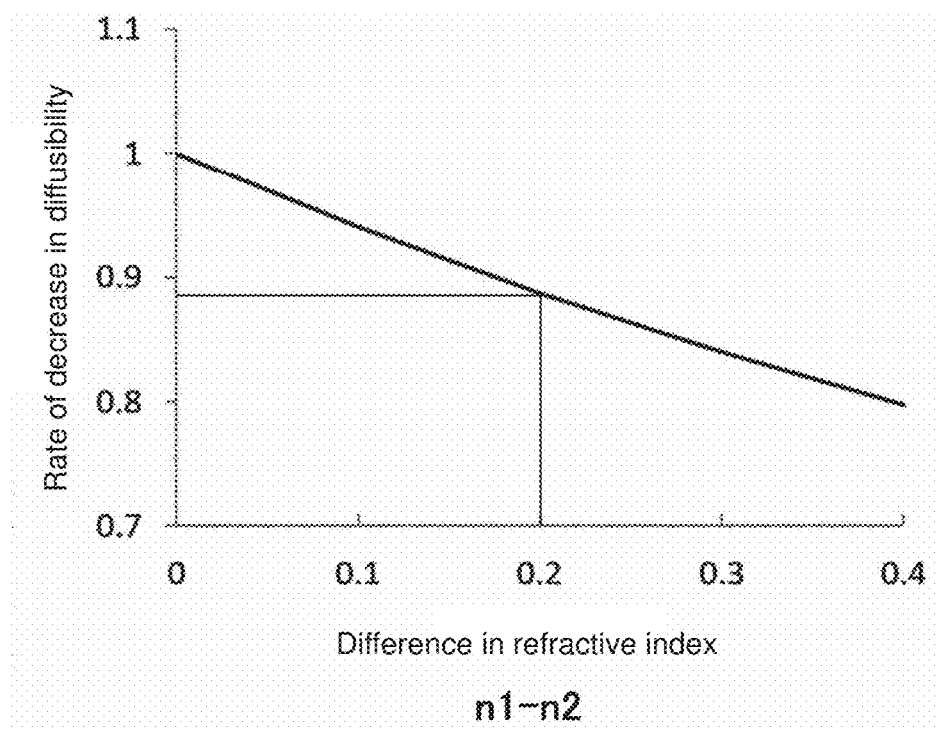

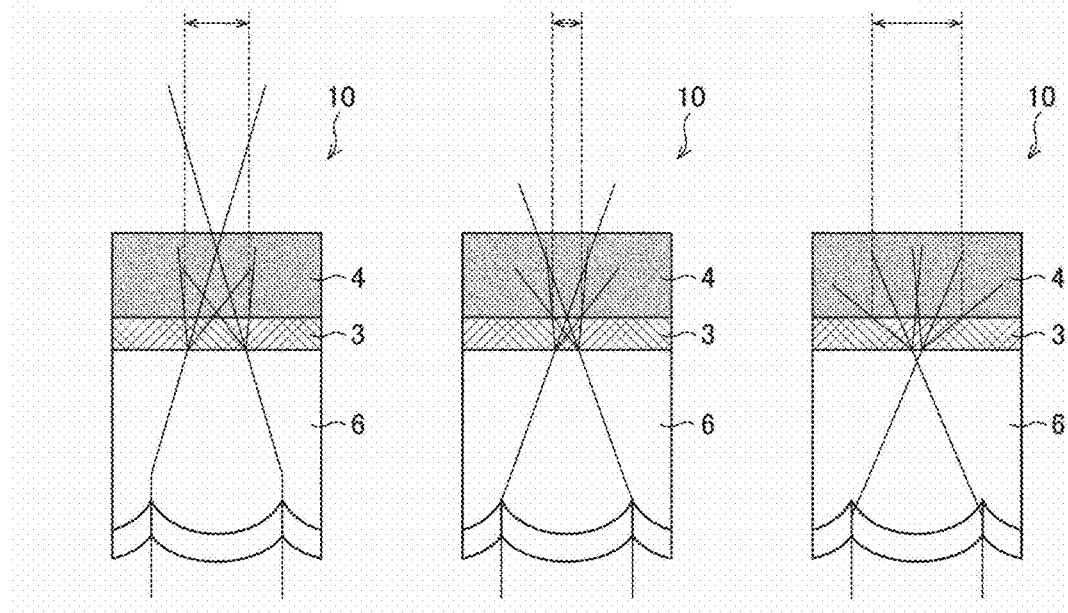
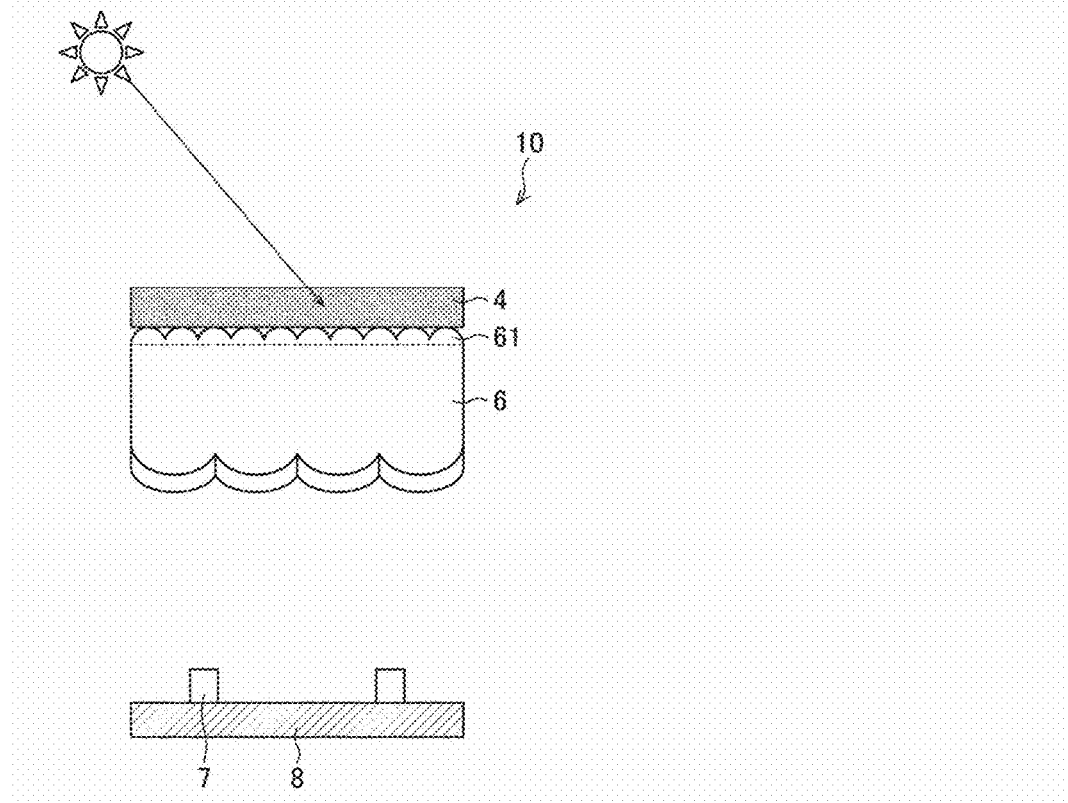

FIG. 14
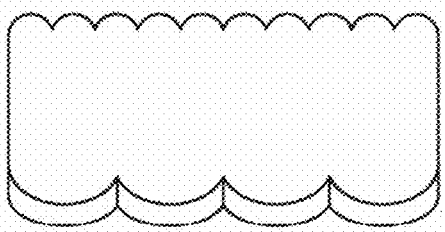
Same diffusion pattern:
Periods of lens array and periods of diffusion patterns are likely to cause moire
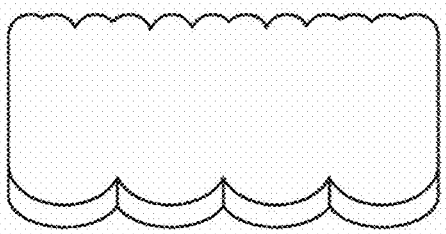
Different diffusion patterns:
Periods of lens array and periods of diffusion patterns differ in places and are less likely to cause moire
FIG. 15
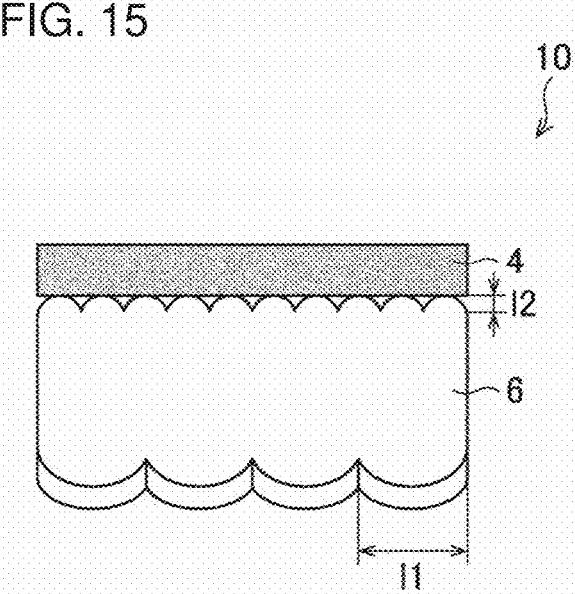

FIG. 18
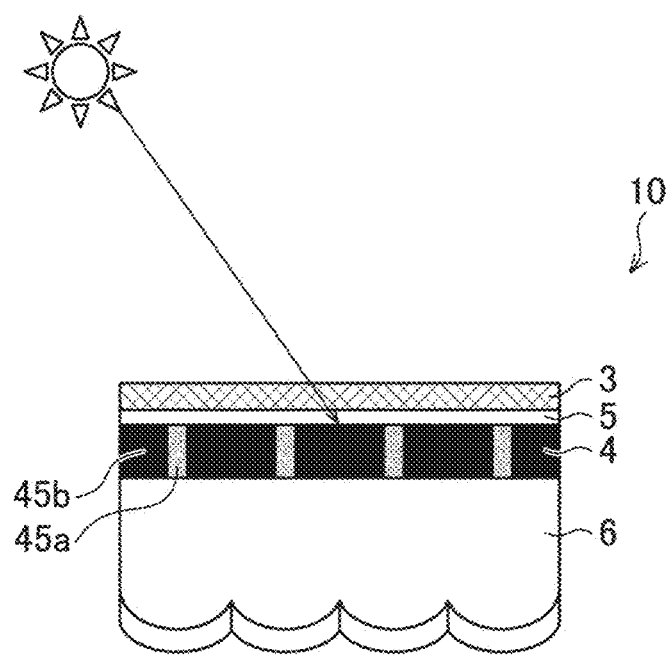
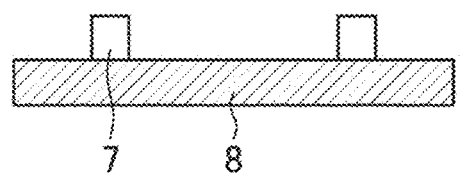

FIG. 19
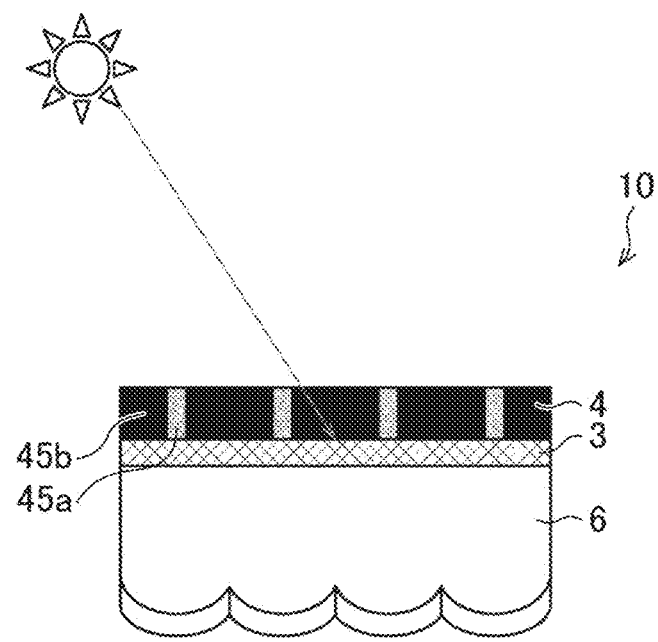
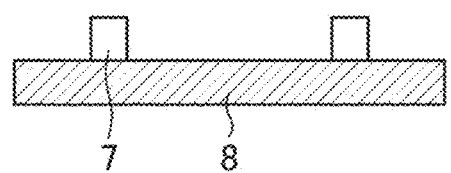

FIG. 20
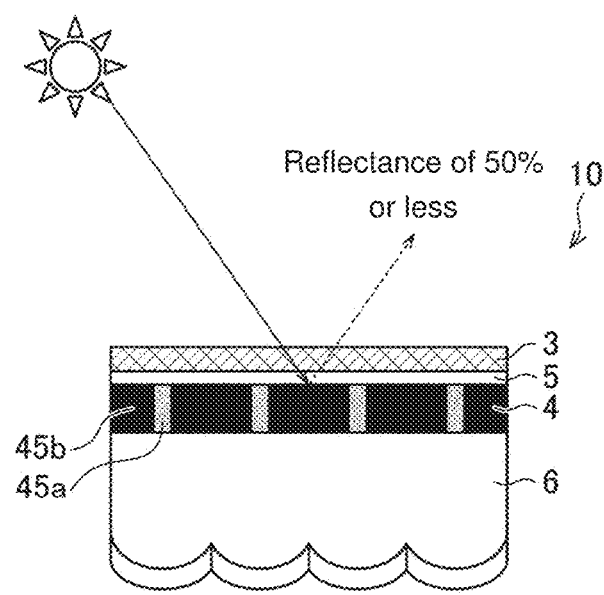
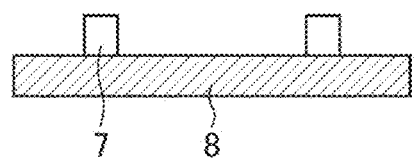

FIG. 21
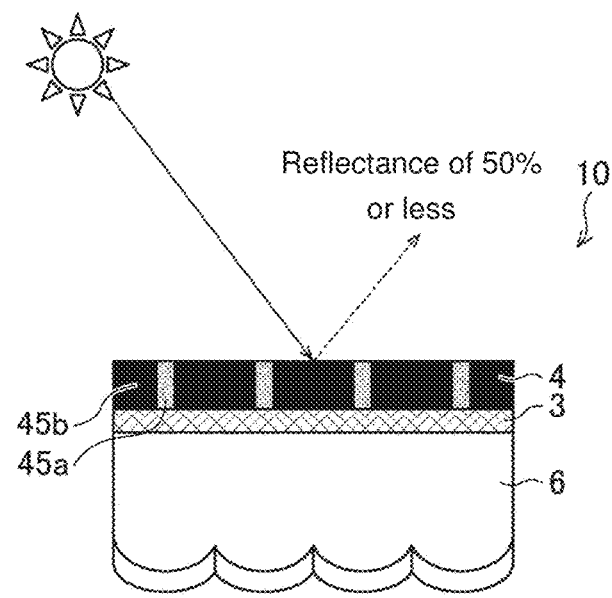
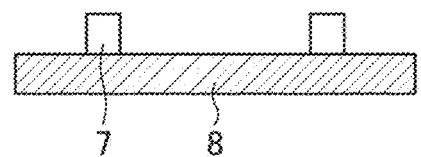
FIG. 22
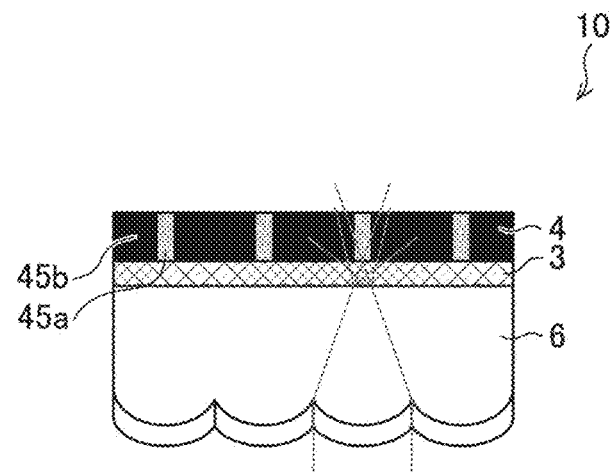

FIG. 24
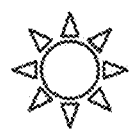
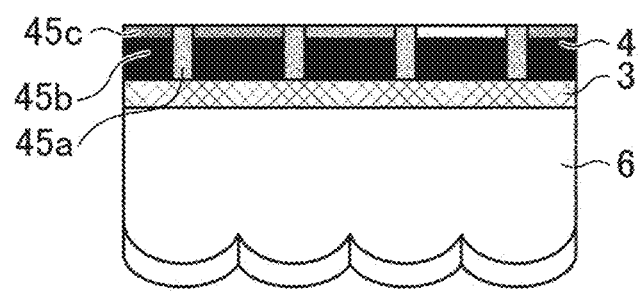
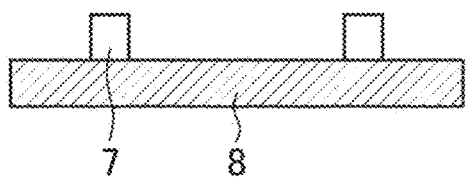

FIG. 25
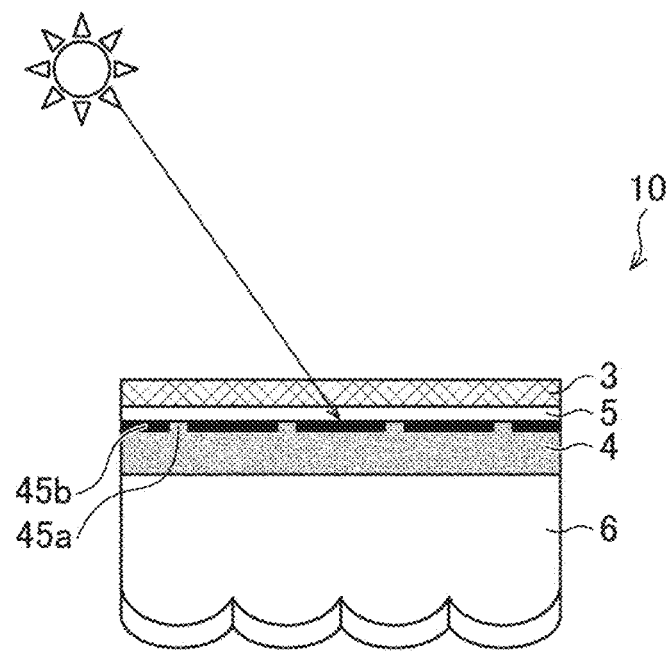
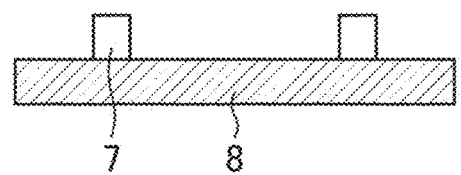

FIG. 26
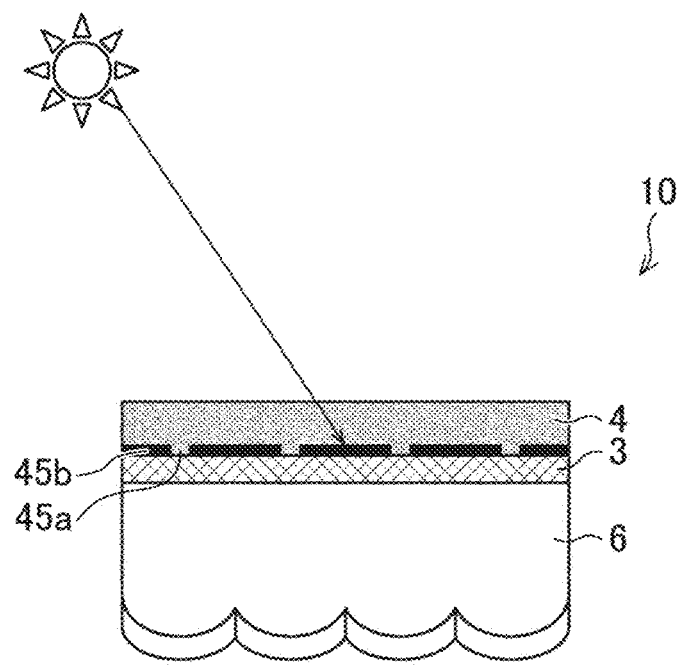
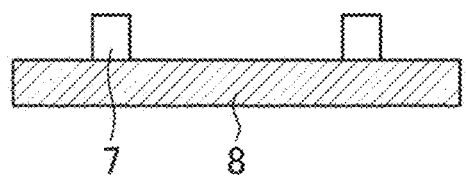

DISPLAY SWITCHING DEVICE, BUTTON DEVICE FOR GAME MACHINE, AND SWITCH

CROSS-REFERENCE TO RELATED APPLICATION

This application claims priority to Japanese Patent Application No. 2020-212776 filed on Dec. 22, 2020, the contents of which are incorporated herein by reference.

FIELD

The disclosure relates to a display switching device, a button device for a game machine including the display switching device, and a switch.

BACKGROUND

A known display switching device may allow light from multiple light sources to pass through a lens array including multiple lenticules, be collected on a display layer, and diffuse in a diffusion layer.

For example, Patent Literature 1 describes a backlit display device for the automatic viewing of lenticular image cards including an illumination source designed to selectively illuminate individual images formed onto lenticular media. In the backlit display device, the illumination source for the display directs light through a portion of the lenticular image card including the lenticules in accordance with the card viewing distance and the selected viewing angle to sequentially illuminate each image.

More specifically, the technique in Patent Literature 1 switches light sources to collect light at different positions on the lenticular lenses, thus selectively illuminating images in the display layer.

More specifically, the known backlit display device may include lenticular lenses including at least multiple lenticules, multiple light sources for emitting light toward the lenticular lenses, and a display layer including multiple images.

The light sources are turned on and off to collect light at different positions on the lenticular lenses, thus selectively illuminating the images in the display layer.

CITATION LIST

Patent Literature

Patent Literature 1: Japanese Unexamined Patent Application Publication No. 2003-195216

SUMMARY

However, the above known technique may cause ambient light around the backlit display device to produce Fresnel reflection at the rear surface of the front diffusion layer, causing the reflected light to diffuse and enter the display device through the front, or in a viewing direction. The Fresnel reflection effect may cause the screen surface to appear white.

One or more embodiments may be directed to alleviate Fresnel reflection of ambient light at the boundary between the rear surface of the diffusion layer and the display layer to reduce the likelihood that the screen of the display layer appears white to the user viewing ambient light resulting from Fresnel reflection.

A display switching device according to one or more embodiments is a display switching device for switching display images by switching light illumination from a plurality of light source positions. The display switching device may include a lens array including a plurality of lenses that allow passage of light from the plurality of light source positions, a display layer including a plurality of pixel regions that allow passage of light collected on the plurality of lenses included in the lens array, and a diffusion layer located opposite to the plurality of light source positions with the lens array in between to diffuse passing light. The diffusion layer optically adheres to a layer adjacent to one of two surfaces of the diffusion layer nearer the plurality of light source positions, or the diffusion layer and the layer adjacent to one of two surfaces of the diffusion layer nearer the plurality of light source positions comprise a same material.

In embodiment structures, the diffusion layer and the display layer optically adhere to each other or are formed from the same material to prevent ambient light from producing Fresnel reflection at the boundary between the rear surface of the diffusion layer and the display layer. Preventing the Fresnel reflection may reduce the likelihood that the display screen appears white on its surface.

In the display switching device according to one or more embodiments, the lens array, the diffusion layer, and the display layer may be arranged in an order of the lens array, the diffusion layer, and the display layer from the plurality of light source positions. In embodiment structures, the display layer is nearest a viewer, and the display layer in the display switching device reduces reflection of ambient light incident in a viewing direction. Embodiment structures may reduce the likelihood that the display layer appears white on its surface with the reflection of ambient light.

In the display switching device according to one or more embodiments, the diffusion layer may have a thickness 0.3 times or less a lens pitch of the plurality of lenses included in the lens array when the diffusion layer may have a haze of 98% or less.

Embodiment structures may prevent image deterioration from crosstalk caused by light from the light sources spreading in the display layer.

In the display switching device according to one or more embodiments, $\theta 3 \leq \theta 1 - \theta 2$ may be satisfied, where $\theta 1$ is an angle of incidence of light from a light source position entering an outermost lens of the plurality of lenses included in the lens array, $\theta 2$ is an angle at which a central light quantity of parallel light entering the plurality of lenses included in the lens array is halved, and $\theta 3$ is an angle at which an intensity is to be 10% of an intensity at an emission angle of 0 degrees in diffusion properties of the diffusion layer.

Embodiment structures may cause light to pass through the lens array and enter the device from the front of the user. Accordingly, embodiment structures may thus include high visibility to the front as viewed from the user.

In the display switching device according to one or more embodiments, $n2 - 0.2 \leq n1 \leq n2 + 0.2$ may be satisfied, where n1 is a refractive index of the diffusion layer, and n2 is a refractive index of the lens array. Embodiment structures may cause the refractive index n1 of the diffusion layer and the refractive index n2 of the lens array to have a small difference between them and reduces Fresnel reflection at the boundary between the lens array and the diffusion layer.

In the display switching device according to one or more embodiments, the diffusion layer may be a single layer comprising a material having diffusibility and adhesiveness to the lens array. In embodiment structures, the diffusion layer and the lens array below the diffusion layer may be seamless as viewed from the viewer and may be formed from the same material. Embodiment structures may thus alleviate Fresnel reflection at the boundary between the diffusion layer and the lens array and prevents the display layer from appearing white on its surface.

In the display switching device according to one or more embodiments, the lens array may include, on a surface adjacent to the display layer, a diffusion pattern for diffusing light passing through the lens array.

Embodiment structures may allow the diffusion pattern on the lens array to alleviate Fresnel reflection of ambient light incident in the viewing direction and prevents the display layer from appearing white on its surface. In addition, the lens array and the diffusion layer are integral with each other. Embodiment structures may eliminate separate formation of the diffusion layer, thus reducing the manufacturing cost.

In the display switching device according to one or more embodiments, the diffusion pattern on the lens array may include a plurality of lens shapes, and the diffusion pattern may have a height 0.3 times or less a lens pitch of the plurality of lenses included in the lens array.

Embodiment structures may prevent image crosstalk in the display layer with light from the light sources spreading in the diffusion layer. The crosstalk refers to image deterioration in the display layer caused by light from a light source that does not enter the image in the display layer illuminated by the light source but enters an image illuminated by a different light source.

In the display switching device according to one or more embodiments, the diffusion pattern on the lens array may include a plurality of lens shapes, and each of the plurality of lens shapes may have a tangent to a cross-sectional profile of the lens shape forming a maximum inclination angle (θ in FIG. 16) of 60 degrees or less with a boundary surface with the display layer.

Embodiment structures use the diffusion pattern to diffuse light from the light sources at a greater angle, thus allowing light to be emitted forward at a position on the lens array at which light from the light sources enters the lens array at a small angle, which improves the visibility to the front of the user.

In the display switching device according to one or more embodiments, the diffusion pattern on the lens array may include a plurality of unit shapes, and the plurality of unit shapes may include at least two different shapes arranged at dispersed locations.

In embodiment structures, the different diffusion patterns at dispersed locations prevent a Moiré pattern that may occur depending on the positional relationship between the same diffusion patterns aligned and the lenses in the lens array.

In the display switching device according to one or more embodiments, the lens array may include a plurality of lenses shaped to collect and focus light from the plurality of light source positions on a boundary between the diffusion layer and the display layer or a position farther from the plurality of light source positions than the boundary.

Embodiment structures may allow light from a light source to form a smaller spot at the boundary between the diffusion layer and the display layer, thus reducing image crosstalk in the display layer.

In the display switching device according to one or more embodiments, the lens array may include a plurality of lenses shaped to collect and focus light from the plurality of light source positions on a position farther from the plurality of light source positions than a boundary between the lens and the diffusion layer.

Embodiment structures may allow light from a light source position to form a smaller spot at the boundary between the diffusion layer and the display layer, thus reducing image crosstalk in the display layer.

The display switching device according to one or more embodiments may further include a pixel-surrounding region surrounding the plurality of pixel regions to reduce reflection or transmission of light from the plurality of light source positions or a position opposite to the plurality of light source positions.

Embodiment structures may allow the pixel-surrounding region to reduce reflection of ambient light or transmission of light from the light sources, thus reducing the likelihood that the display layer appears white.

In the display switching device according to one or more embodiments, the pixel-surrounding region may have a reflectance of 50% or less with respect to light from the position opposite to the plurality of light source positions.

Embodiment structures may reduce reflection of ambient light incident in the viewing direction and reduces the likelihood that the display layer appears white.

In the display switching device according to one or more embodiments, the pixel-surrounding region may have a transmittance of 50% or less with respect to light from the plurality of light source positions.

Embodiment structures may prevent the display layer from appearing white with the transmission of light from the light source positions.

In the display switching device according to one or more embodiments, the pixel-surrounding region may have a colored area corresponding to a pattern visible with light from the position opposite to the plurality of light source positions.

Embodiment structures may allow the pixel-surrounding region to prevent the display layer from appearing white and display a pattern with the lights turned off.

In the display switching device according to one or more embodiments, the pixel-surrounding region may be nearer at least the diffusion layer in a thickness direction of the display layer.

In the display switching device according to one or more embodiments, when the diffusion layer is adjacent to one of two surfaces of the display layer opposite to the plurality of light source positions, the diffusion layer may be thicker in an area in contact with the plurality of pixel regions than in an area in contact with the pixel-surrounding region.

Embodiment structures may reduce the diffusion of reflected ambient light while maintaining the diffusibility of light from the light sources.

A button device for a game machine includes the display switching device according to one or more embodiments. The button device includes a button body, and the display switching device described above. The button body may be depressed into a housing of the game machine.

The button device for a game machine with the above-described structure may reduce the likelihood that the display layer appears white on its surface.

A switch according to one or more embodiments may include the display switching device described above. The switch may detect a user operation on the display switching device.

The switch with the above-described structure may reduce the likelihood that the display layer appears white on its surface.

The above-described structure may allow the pixel-surrounding region to reduce the reflection of ambient light incident in the viewing direction and reduces the likelihood that the display layer appears white.

BRIEF DESCRIPTION OF THE DRAWINGS

FIG. 1 is a schematic diagram illustrating a display switching device according to a first embodiment.

FIG. 2 is a schematic diagram illustrating a display switching device according to a second embodiment.

FIG. 3 is a diagram illustrating a relationship between a thickness of a diffusion layer and crosstalk in a display switching device according to a second embodiment.

FIG. 11 is a diagram illustrating a relationship between a difference in refractive index, and an angle of total reflection and a rate of decrease in diffusibility in a display switching device according to a second embodiment.

FIGS. 12A, 12B, and 12C are diagrams illustrating focal positions of light from a light source in a display switching device according to a second embodiment.

FIG. 13 is a schematic diagram illustrating a display switching device according to a third embodiment.

FIG. 14 is a diagram illustrating a relationship between diffusion patterns and Moiré patterns in a display switching device according to a third embodiment.

FIG. 15 is a diagram illustrating a relationship between a thickness of a diffusion pattern on a lens array and a lens pitch in a display switching device according to a third embodiment.

FIG. 18 is a schematic diagram illustrating a display switching device according to a fourth embodiment.

FIG. 19 is a schematic diagram illustrating another exemplary display switching device according to a fourth embodiment.

FIG. 20 is a diagram illustrating a reflectance in a display switching device according to a fourth embodiment.

FIG. 21 is a diagram illustrating a reflectance in another exemplary display switching device according to a fourth embodiment.

FIG. 22 is a diagram illustrating reduction of crosstalk by a pixel-surrounding region in a display switching device according to a fourth embodiment.

FIG. 24 is a schematic diagram illustrating another exemplary display switching device according to a fifth embodiment.

FIG. 25 is a diagram illustrating prevention of crosstalk in a display switching device according to a fifth embodiment.

FIG. 26 is a diagram illustrating prevention of crosstalk in another exemplary display switching device according to a fifth embodiment.

DETAILED DESCRIPTION one or more embodiments will now be described with reference to the drawings.

Basic Structure of Display Switching Device

A basic structure according to one or more embodiments will first be described below with reference to FIGS. 28 and 29 before being described in greater detail.

Figure 28:
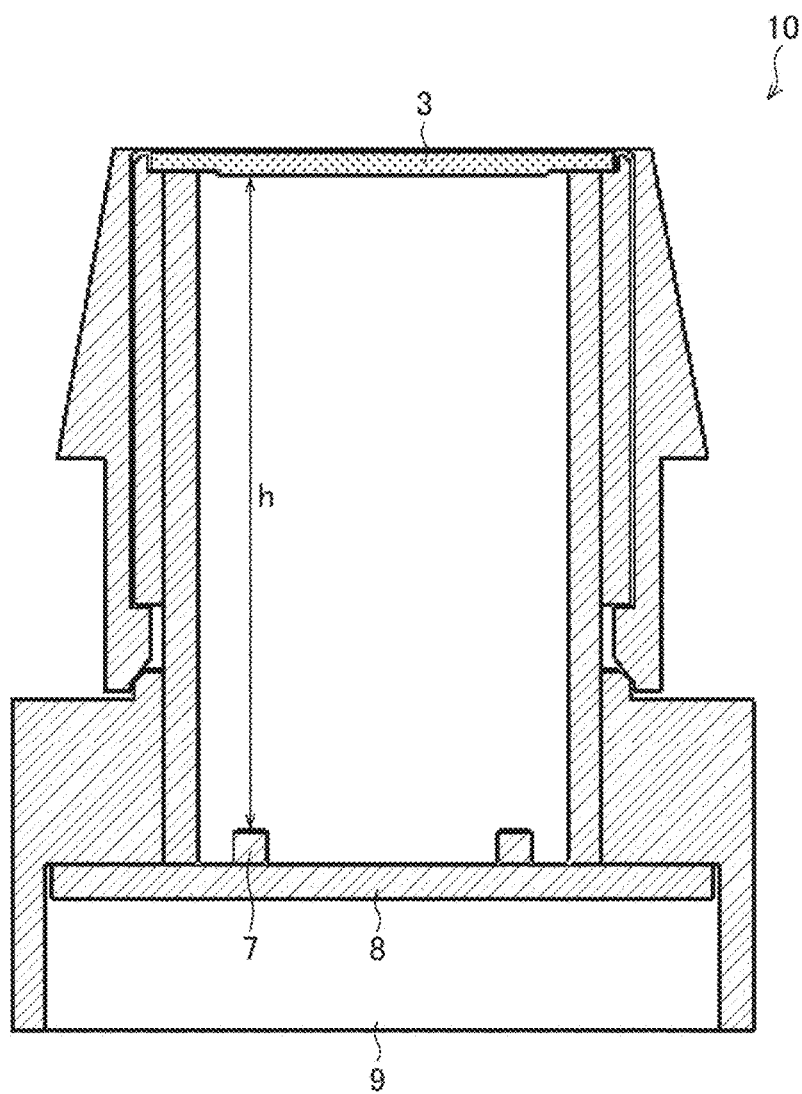
FIG. 28 is a schematic diagram illustrating a display switching device according to an embodiment, showing a basic structure.
Figure 29:
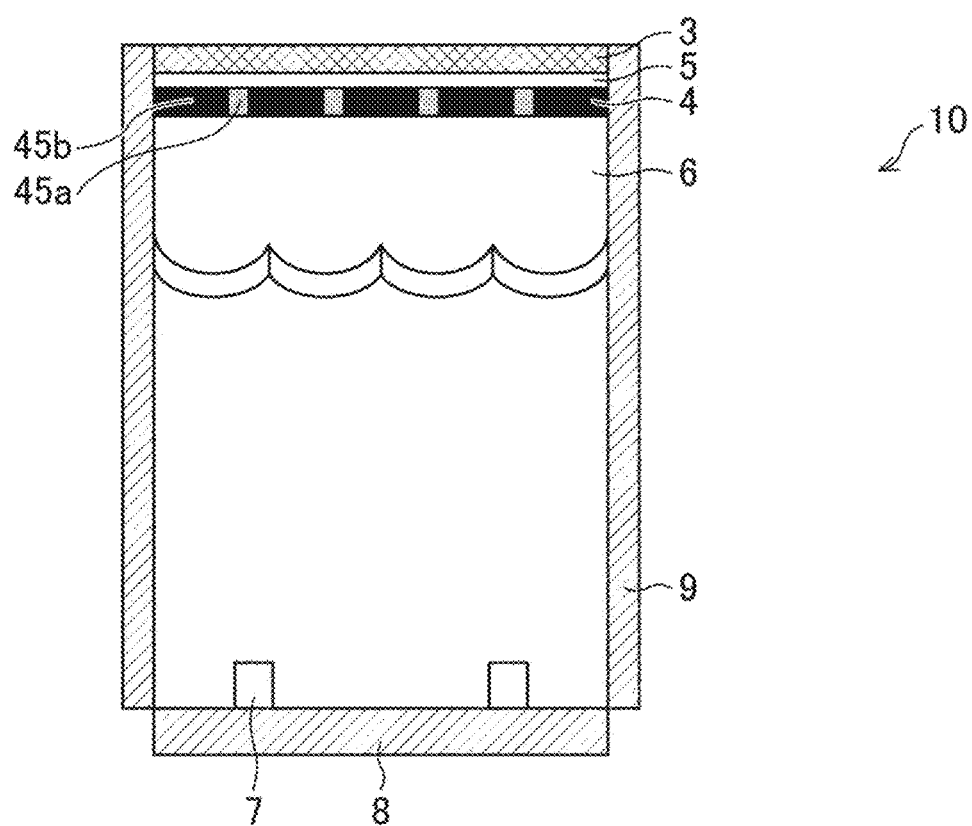
FIG. 29 is a schematic diagram illustrating a display switching device according to a first embodiment, showing a basic structure in detail.

FIG. 28 is a schematic diagram of a display switching device according to one or more embodiments showing its basic structure, and FIG. 29 is a diagram showing the structure in greater detail.

As shown in FIGS. 28 and 29, a display switching device 10 includes a diffusion layer 3, a display layer 4, a lens array 6, multiple light sources 7, and a board 8 in this order from top to bottom in the figures. The diffusion layer 3 and the display layer 4 are bonded by an adhesive layer 5 between them.

For example, the diffusion layer 3 is square as viewed from above. The light sources 7 may be RGB light-emitting diodes (LEDs). However, the light sources 7 may be eliminated. In this case, a user prepares a light source.

The diffusion layer 3 may have a thickness of 0.1 mm, and a haze value of 90%.

The display layer 4 is also referred to as an image layer and has a thickness of 0.1 mm. For example, the display layer 4 includes pixel regions 45a (hereafter also referred to as openings) and a pixel-surrounding region 45b (hereafter also referred to as a mask) as an area other than the pixel regions 45a. The pixel-surrounding region 45b herein refers to the region surrounding each pixel region 45a and having a constant transmittance. The pixel-surrounding region 45b also blocks light from positions of the light sources, or in other words, light from positions of the arrangement of the lens array 6.

As shown in FIG. 29, the lens array 6 below the display layer 4 collects light from the multiple light sources 7 mounted on the board 8. For example, the lens array 6 has a thickness of 0.4 mm. The lens array 6 is an array of multiple lenses.

The display layer 4 includes the multiple pixel regions 45a arranged to have areas that allow passage of light from the positions of the light sources 7 collected on the lenses in the lens array 6. Each of the pixel regions 45a has a transmittance preset in accordance with predetermined stationary patterns.

The diffusion layer 3, the display layer 4, and the lens array 6 are supported on a housing 9. The housing 9 is attached to the board 8 on which the multiple light sources 7 are mounted, forming the basic structure of the display switching device 10. The display switching device 10 may also include a protective layer above the diffusion layer 3 to prevent damage.

In FIG. 28, a distance h between the upper end of a light source 7 and the lower end of the lens array 6 is, for example, 20 mm.

In the display switching device 10 with the above structure, light illumination from the positions of the multiple light sources 7 is switched to change display images P displayed on the display layer 4. The light sources 7 are turned on and off by a light source controller (not shown). For example, the light source controller may be an IC chip mounted on the board for light source control.

Example Lens Array Structure

An example lens array structure will now be described with reference to FIGS. 30A to 30C and subsequent figures.

Figure 30A:
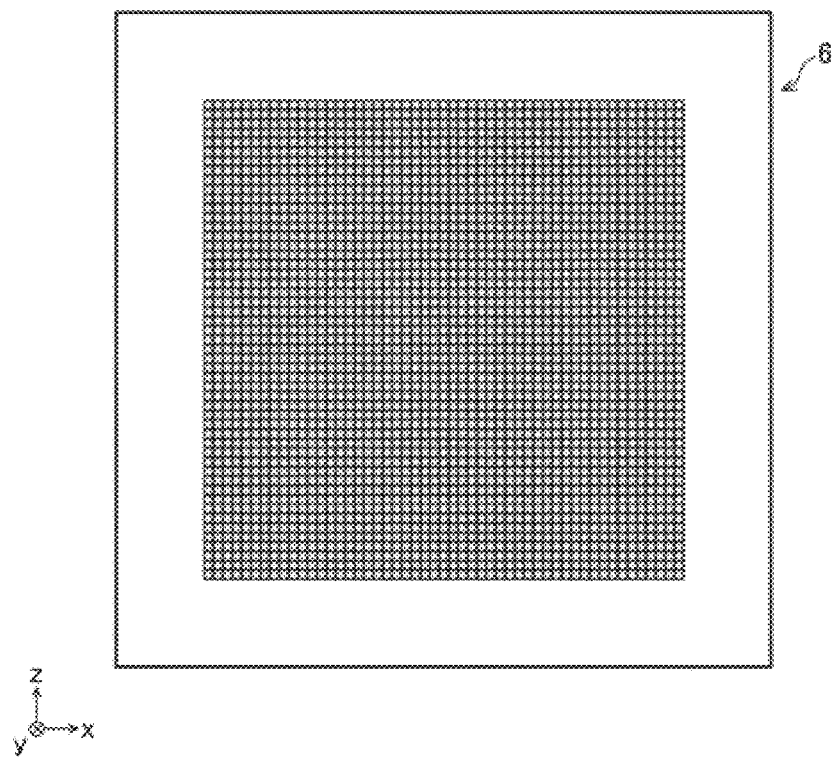
FIG. 30A is a diagram illustrating a top view of a micro-lens array structure in a display switching device according to one or more embodiments.
Figure 30B:
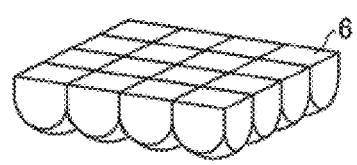
FIG. 30B is a partial perspective view of a structure.
Figure 30C:
FIG. 30C is a partial cross-sectional view of a structure.

FIGS. 30A, 30B, and 30C each show an example structure of the lens array 6 in FIG. 29. For example, as shown in FIG. 30A, the lens array 6 includes multiple lenses arranged in a two-dimensional matrix.

Figure 31A:
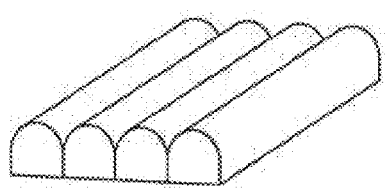
FIGS. 31A, 31B, and 31C are diagrams illustrating variations of a lens arrangement in a lens array according to one or more embodiments.
Figure 31B:
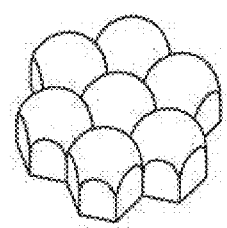
Figure 31C:
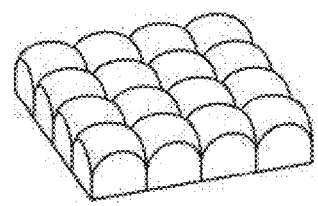

FIG. 30B is an enlarged perspective view of a part of the lens array 6. FIG. 30C is an enlarged cross-sectional view of a part of the lens array 6. FIGS. 31A to 31C are diagrams showing variations of the lens arrangement in the lens array according to one or more embodiments. FIGS. 31A to 31C are diagrams showing variations of the arrangement of the pixel regions 45a in the display layer 4. In FIG. 31A, the lenses in the lens array 6 are arranged one-dimensionally. In FIG. 31B, the pixel regions 45a and the lenses in the lens array 6 are arranged in a two-dimensional honeycomb. In FIG. 31C, the pixel regions 45a and the lenses in the lens array 6 are arranged in a two-dimensional matrix.

As shown in FIGS. 31B and 31C, with the pixel regions 45a arranged two-dimensionally, pixels each having multiple pixel regions 45a may also be arranged two-dimensionally. The lenses in the lens array 6 are arranged in accordance with the corresponding pixels. Each pixel includes the number of pixel regions 45a corresponding to the number of light sources to be switched.

FIG. 31A shows the lens array 6 including multiple cylindrical lenses arranged in one direction similarly to a known lenticular lens array. In this case, the pixel regions 45a are divided along the length of the cylindrical lenses into a predetermined number of sets, and positioned in a predetermined arrangement.

This may allow image switching between various patterns with the lens array 6 having multiple cylindrical lenses arranged in one direction.

Figure 32:
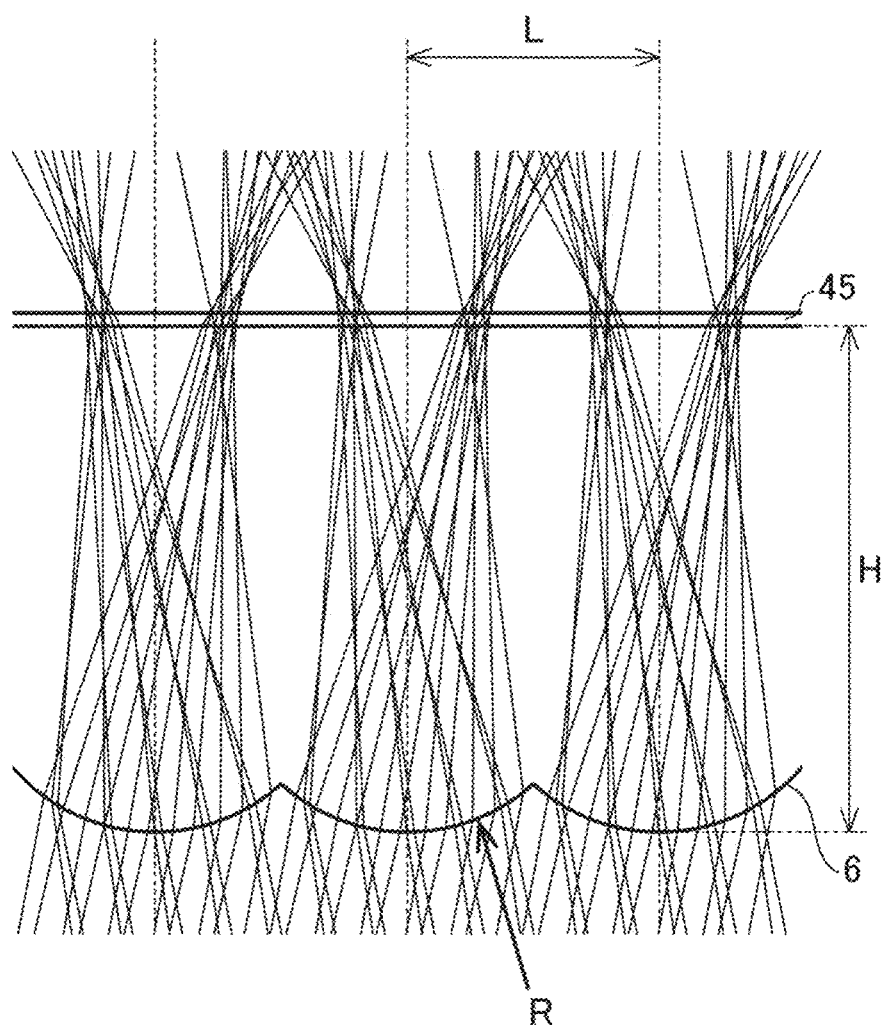
FIG. 32 is a diagram illustrating light collected on a micro-lens array in a display switching device according to one or more embodiments.

FIG. 32 is a diagram illustrating light collected on the lens array 6. As shown in the figure, light from light sources at different positions is collected at different sites.

When the display switching device 10 is used for a key top on a keyboard, the lenses in the lens array 6 may have dimensions of, for example, a lens-to-lens distance L of about 200 μm between adjacent lenses, a curvature radius R of about 150 μm of a convex part of each lens, a maximum thickness H of about 400 μm in the light emission direction of each lens, and a refractive index n of 1.5.

Figure 33:
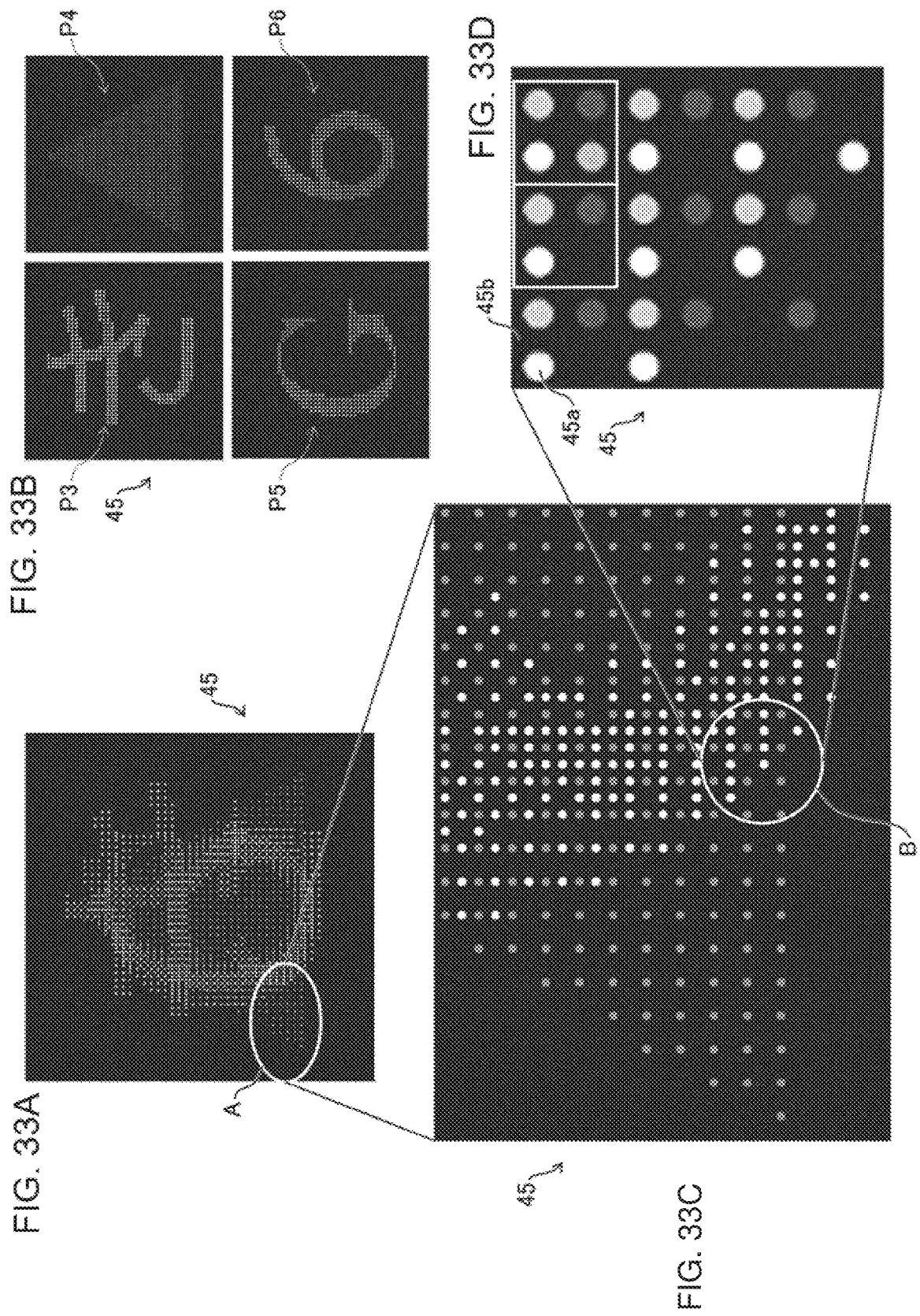
FIGS. 33A, 33B, 33C, and 33D are diagrams illustrating exemplary switchable displays in a display layer in a display switching device according to one or more embodiments.

FIGS. 33A to 33D each show example switchable displays on the display layer 4. FIG. 33A shows an example display on the display layer (also referred to as the image layer) 4. FIG. 33B shows example patterns to be displayed. FIG. 33C is an enlarged view of part A in FIG. 33A. FIG. 33D is an enlarged view of part B in FIG. 33C.

As shown in FIGS. 33A to 33D, for example, the same image layer may display a third image P3 (Japanese hiragana character ki in this example), a fourth image P4 (a triangle pattern Δ in this example), a fifth image P5 (capital G in this example), and a sixth image P6 (number 6 in this example) in a switchable manner.

In an example shown in FIG. 33D, the overall display layer 4 may be divided into multiple areas (pixels) each including a maximum of four pixel regions 45a for display switching.

In an example, adjacent areas have a pitch of about 200 μm, adjacent pixel regions 45a in the same area are about 100 μm apart, and the pixel regions 45a have a diameter of 30 to 80 μm. As shown in FIG. 33D, a display area 45 includes the pixel regions 45a and the other region, which is the pixel-surrounding region 45b.

Figure 34:
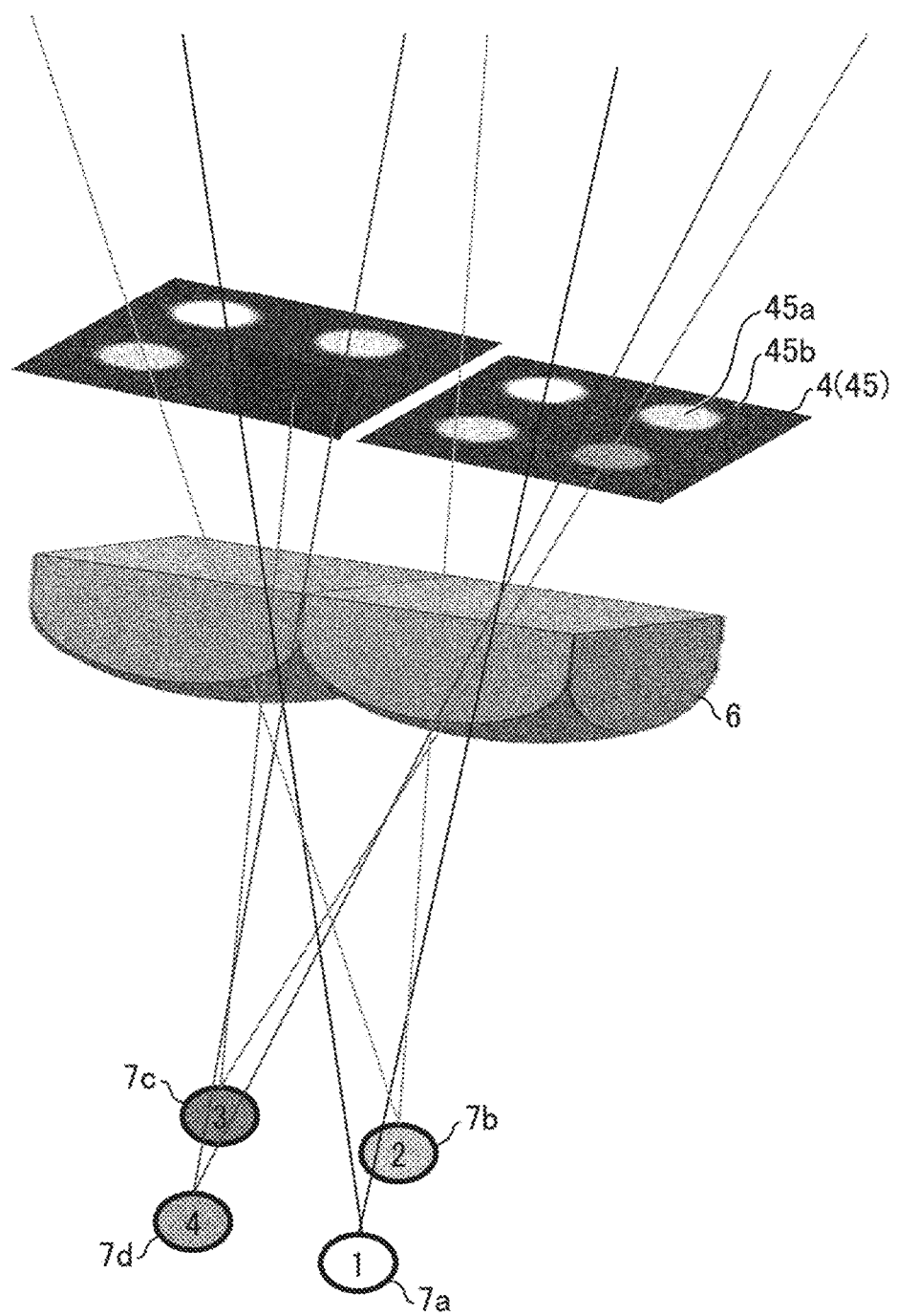
FIG. 34 is a diagram illustrating a correspondence between a display layer, lenses forming a micro-lens array, and light sources in a display switching device according to one or more embodiments.

FIG. 34 is a diagram showing the correspondence between the display layer 4 (display area 45), lenses forming the lens array 6, and the light sources 7. FIG. 34 shows light sources 7a to 7d that emit light of colors such as white, green, red, and blue.

FIG. 34 illustrates two pixels, and light from each light source is collected on the lens array 6 and is emitted through the corresponding pixel region 45a. Each pixel is divided into the pixel regions 45a and the pixel-surrounding region 45b.

Figure 35A:
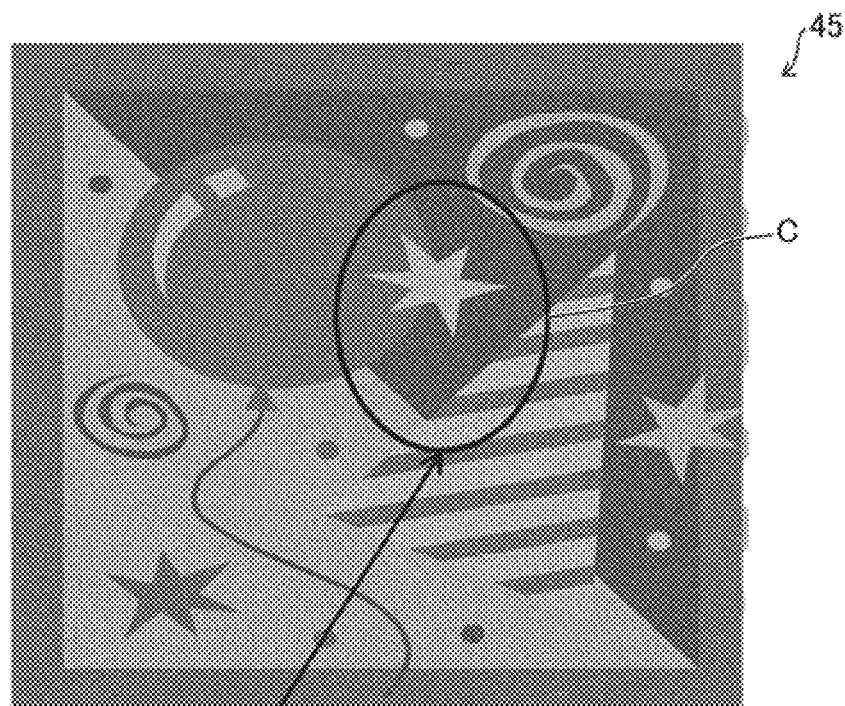
FIG. 35A is a diagram illustrating a plan view of a display layer in a display switching device according to one or more embodiments.
Figure 35B:
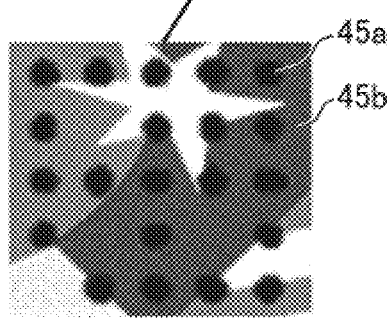
FIG. 35B is an enlarged view of a part of a display layer.

FIG. 35A is a plan view of the display layer 4. FIG. 35B is an enlarged view of a part of the display layer 4. As shown in FIG. 35B, an image is preformed on the pixel-surrounding region 45*b* by, for example, printing.

More specifically, the pixel-surrounding region 45*b* shows different colors or reflectances depending on the site in response to ambient light incident on the display layer 4 through its surface opposite to the arrangement of the lens array 6.

In this structure, the pixel-surrounding region 45*b* shows different colors or reflectances depending on the site in response to ambient light, allowing the user to view a predetermined pattern without light from the light sources 7. Embodiment structures may allow the image formed by the pixel regions 45*a* to be inconspicuous when the light sources 7 emit no light.

The basic structure of the display switching device in accordance with one or more embodiments has been described above. The structures of display switching devices according to various embodiments will now be described.

First Embodiment

As shown in FIG. 1, a display switching device 10 according to a first embodiment switches display images by switching light illumination from the positions of multiple light sources 7, and includes a lens array 6 including multiple arranged lenses that allow passage of light from the light source positions, a display layer 4 including pixel regions 45*a* that allow passage of light collected on the lenses in the lens array 6, and a diffusion layer 3 located opposite to the light source positions with the lens array 6 in between to diffuse passing light. The diffusion layer 3 optically adheres to a layer adjacent to one of its two surfaces nearer the light source positions, or the diffusion layer 3 and the layer adjacent to one of its two surface nearer the light sources 7 (the display layer 4 in the present embodiment) are formed from the same material.

For example, the display switching device 10 includes the lens array 6, the display layer 4, an adhesive layer 5, and the diffusion layer 3 in this order from the light sources 7 (from below in FIG. 1). Light from the light sources 7 is collected on the lenses in the lens array 6 and directed into the display layer 4. The light directed into the display layer 4 partially passes through the pixel regions 45*a*, diffuses in the diffusion layer 3 at a wider viewing angle, and is emitted outside. The display layer 4 and the diffusion layer 3 optically adhere to each other with the adhesive layer 5 between them.

The display switching device 10 may eliminate the adhesive layer 5, and the diffusion layer 3 may be adhesive to the display layer 4. For example, the diffusion layer 3 may be formed from a material containing particles dispersed in transparent adhesive.

The above structure including the diffusion layer 3 and the display layer 4 optically adhering to each other with the adhesive layer 5 between them prevents ambient light incident on the diffusion layer 3 in the viewing direction (incident from above in the figure, or from a position nearer the diffusion layer 3) from producing Fresnel reflection at the boundary between the rear surface of the diffusion layer 3 and the display layer 4. Embodiment structures reduce the likelihood that the display screen appears white.

Second Embodiment

As in the first embodiment described above, a known diffusion layer 3 is placed above a display layer 4 (nearer the viewer) to prevent an increase in crosstalk caused by light from the light source positions diffusing between the display layer 4 and a lens array 6. However, the inventors have noticed that the structure described in one or more embodiments below may allow the diffusion layer 3 to be placed between the display layer 4 and the lens array 6.

As shown in FIG. 2, a display switching device 10 according to a second embodiment may include a lens array 6, a diffusion layer 3, and a display layer 4 arranged in this order from the light source positions. For example, the lens array 6, the diffusion layer 3, and the display layer 4 are arranged in this order from light sources 7 (from below in FIG. 2), and the diffusion layer 3 and the lens array 6 optically adhere to each other with an adhesive layer 5 between them. The diffusion layer 3 and the lens array 6 may not have the adhesive layer 5 between them, but the diffusion layer 3 may be adhesive to the lens array 6.

The above-described structure with the diffusion layer 3 positioned below the display layer 4 as viewed from the viewer reduces the likelihood that the surface of the display layer 4 appears white with the reflection of ambient light incident on the display layer 4 in the viewing direction. The optical adherence between the diffusion layer 3 and the lens array 6 also reduces reflection of ambient light at the boundary between the rear surface of the diffusion layer 3 and the lens array 6. Additionally, the diffusion layer 3 and the lens array 6 adhering to each other position the lens array 6 and the display layer 4.

When the diffusion layer 3 has a haze of 98% or less, the diffusion layer 3 may have a thickness 0.3 times or less the lens pitch of the lenses in the lens array 6. The thickness of the diffusion layer 3 within the limits reduces image crosstalk (image deterioration caused by light from a light source 7 entering a pixel region 45*a* adjacent to one of the openings in the display layer 4, or the pixel regions 45*a*) caused by light from the light sources 7 diffusing in the diffusion layer 3.

The above-described phenomenon will be described below with reference to FIGS. 4 and 6.

Figure 4:
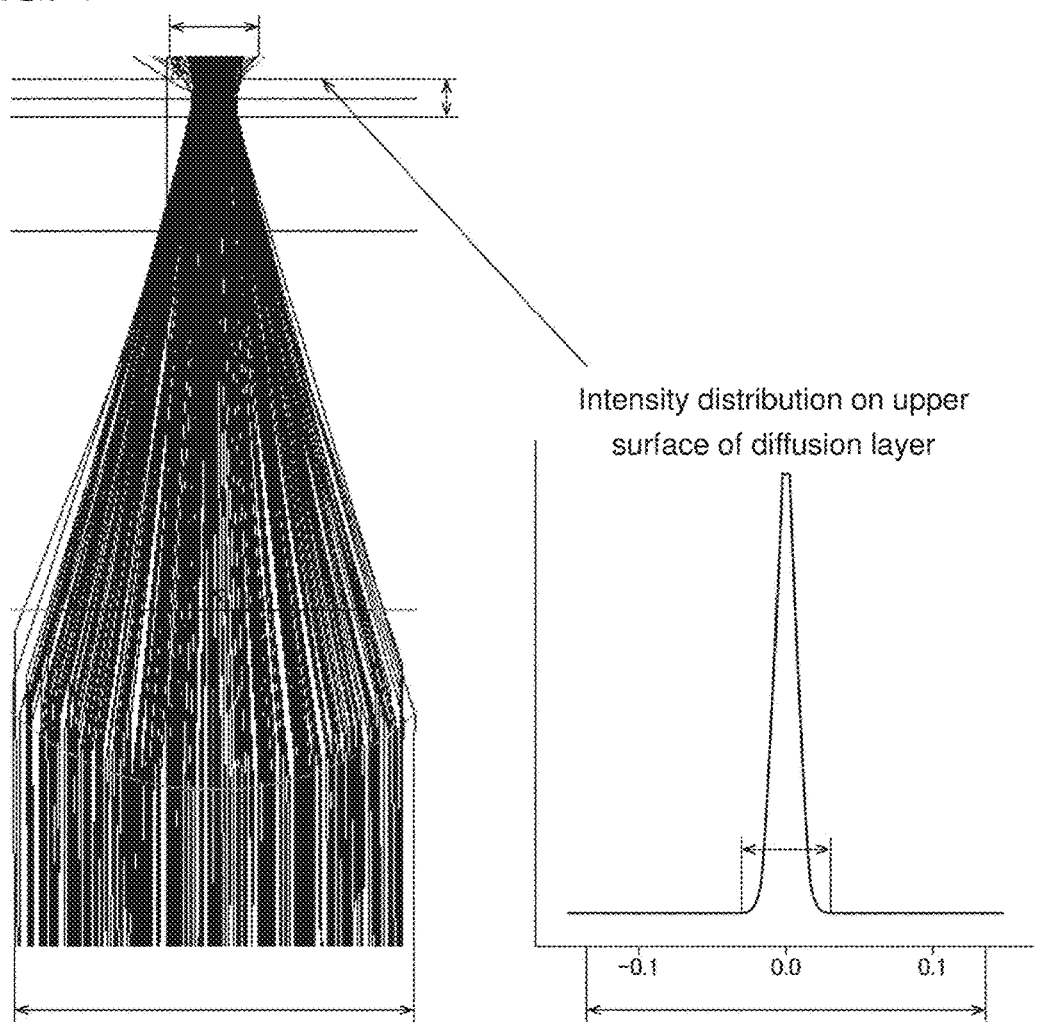
FIG. 4 is a diagram illustrating crosstalk in a display layer occurring depending on a thickness of a diffusion layer in a display switching device according to a second embodiment.

As illustrated in the diagram on the left part of FIG. 4, light from the light sources 7 is collected on the lenses in the lens array 6, passes through the diffusion layer 3, and forms an image at the boundary with the display layer 4. As the thickness of the diffusion layer 3 increases, light diffusion widens at the boundary between the diffusion layer 3 and the display layer 4, and light passing through the boundary between the diffusion layer 3 and the display layer 4 spreads more widely. The graph shown in the right part of FIG. 4, shows the light intensity distribution at the boundary between the diffusion layer 3 and the display layer 4. When the light spread at the boundary with the display layer 4 is more than 0.5 times the lens pitch, the light enters an adjacent pixel region 45*a* in the display layer 4, causing crosstalk. To prevent crosstalk, the light spread at the boundary with the display layer 4 is to be 0.5 times or less the lens pitch.

As shown in FIG. 3, with a diffusion layer 3 that is too thick, light beams from at least two light sources may mix with each other to increase crosstalk, causing a failure to switch the light from the light sources.

Figure 6:
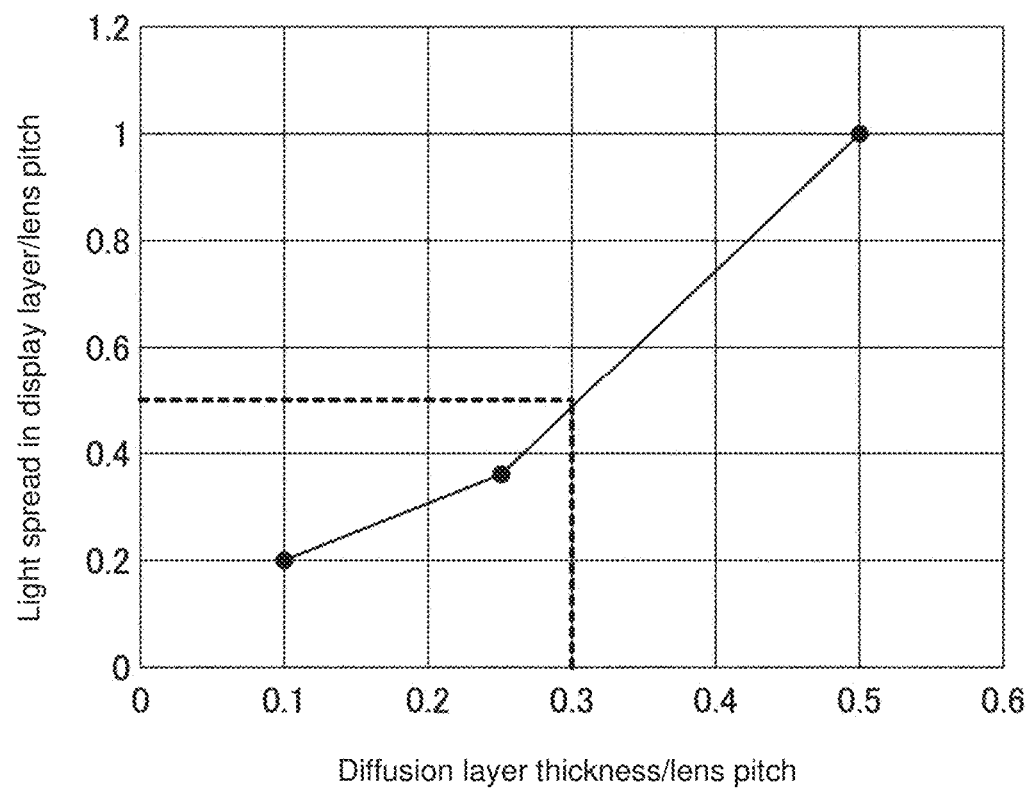
FIG. 6 is a diagram illustrating a graph of a relationship between a thickness of a diffusion layer divided by a lens pitch, and a light spread in a display layer divided by a lens pitch in a display switching device according to a second embodiment.

FIG. 6 is a graph showing the relationship between the thickness of the diffusion layer 3 divided by the lens pitch, and the light spread in the display layer 4 divided by the lens pitch. As shown in FIG. 6, for the light spread at the boundary with the display layer 4 to be 0.5 times or less the lens pitch, the thickness of the diffusion layer 3 is to be 0.3 times or less the lens pitch.

Figure 5:
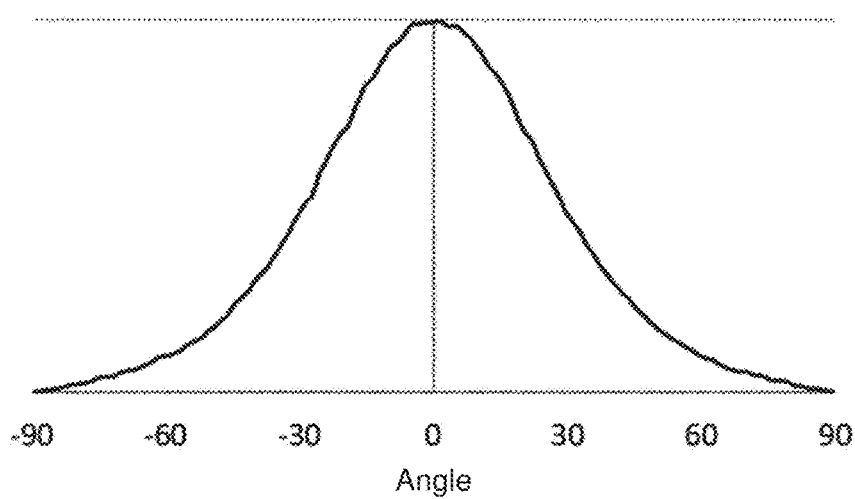
FIG. 5 is a graph illustrating a relationship between a degree of diffusion in a diffusion layer and a light spread in response to parallel light entering a diffusion layer in a display switching device according to a second embodiment.

FIG. 5 is a graph describing the relationship between the degree of diffusion in the diffusion layer 3 and the light spread in response to parallel light entering the diffusion layer 3 in the display switching device 10 according to the second embodiment. The degree of diffusion in the diffusion layer 3 is based on parallel light entering the diffusion layer 3 and spreading as shown in the graph of FIG. 5. The haze, which is a typical indicator of diffusibility, is about 98% showing high diffusibility. With the diffusion layer 3 having the characteristics shown in FIG. 5, the thickness of the diffusion layer 3 may be 0.3 times or less the lens pitch of the lenses in the lens array 6.

The diffusion layer 3 has microparticles contained in its base material, and the particles diffuse light. The base material is acrylic, polycarbonate, polyethylene terephthalate (PET), or other resin. The microparticles are beads or fillers different from the silicone or urethane base substrate in refractive index. The microparticles contained in the base have a size of about several to tens of micrometers.

Figure 7:
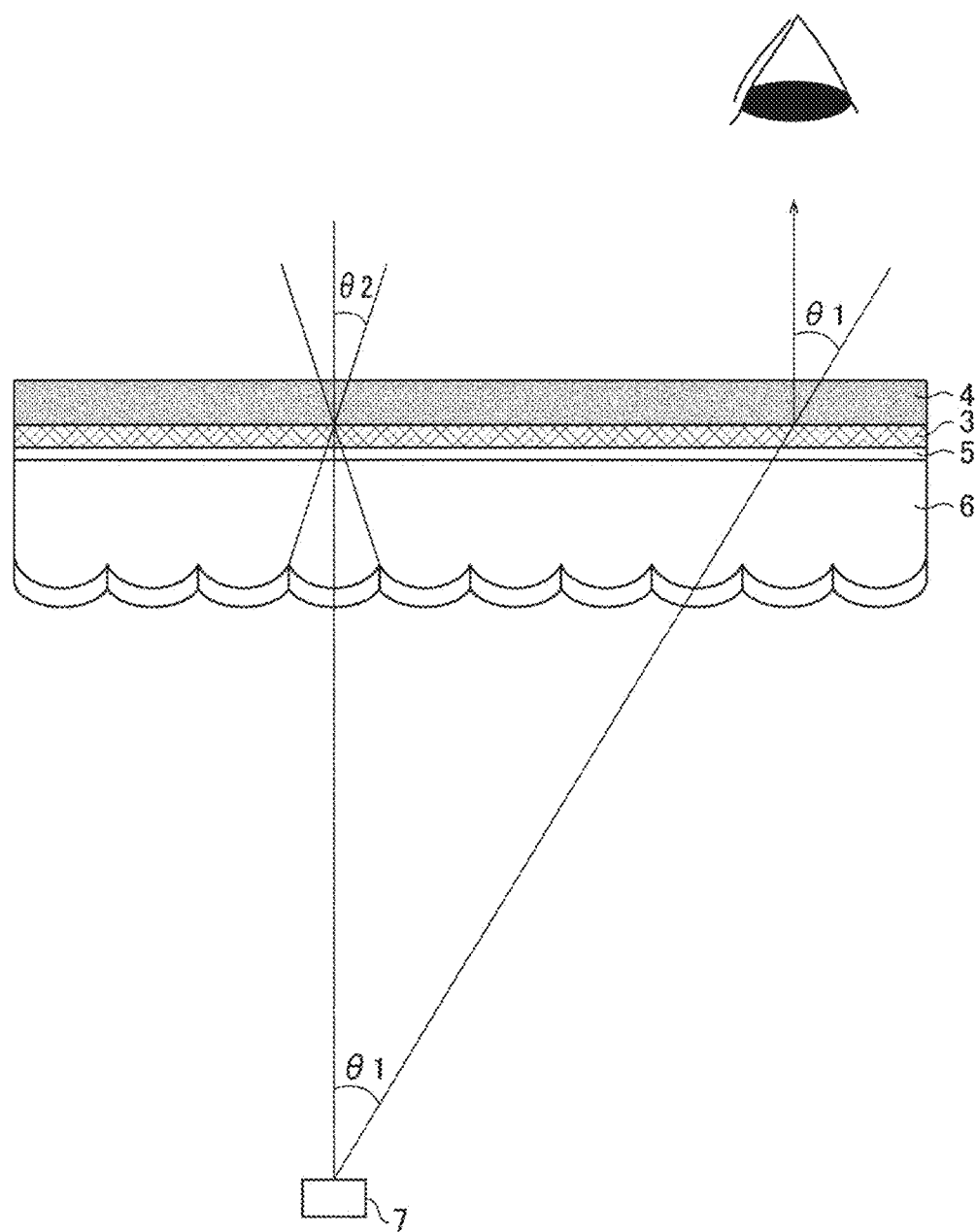
FIG. 7 is a diagram illustrating an angle of a path of light from a light source in a display switching device according to a second embodiment.

FIG. 7 is a diagram describing the angle of the path of light from a light source in the display switching device according to the second embodiment. In FIG. 7, $\theta 3 \geq \theta 1 - \theta 2$ may be satisfied, where $\theta 1$ is an angle of incidence of light from a light source position and entering an outermost lens in the lens array, $\theta 2$ is an angle at which the central light quantity of parallel light entering the lenses in the lens array is halved, and $\theta 3$ is an angle at which an intensity is to be 10% of the intensity at an emission angle of 0 degrees in the diffusion properties of the diffusion layer.

Figure 8:
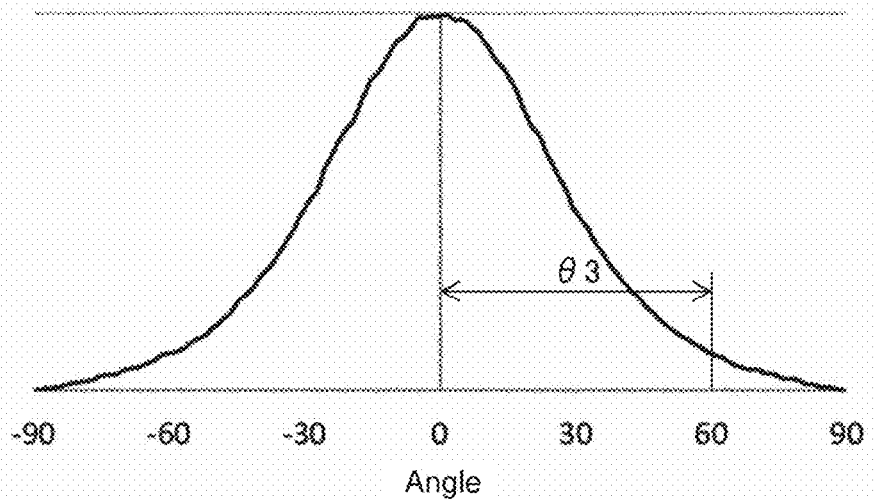
FIG. 8 is a diagram illustrating a graph of a diffusion properties of a diffusion layer in a display switching device according to a second embodiment.
Figure 9:
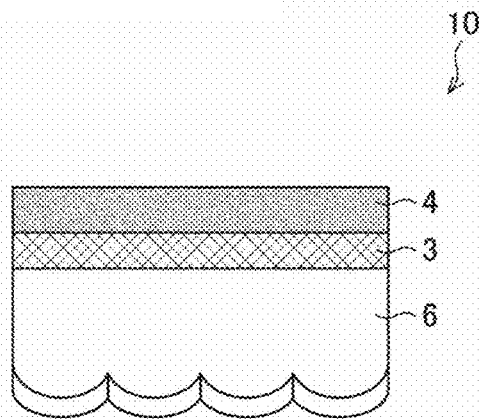
FIG. 9 is a schematic diagram illustrating another exemplary display switching device according to a second embodiment.
Figure 10:
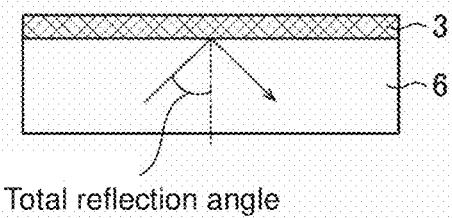
FIG. 10 is a diagram illustrating a difference in refractive index between a diffusion layer and a lens array in a display switching device according to a second embodiment.
Figure 16:
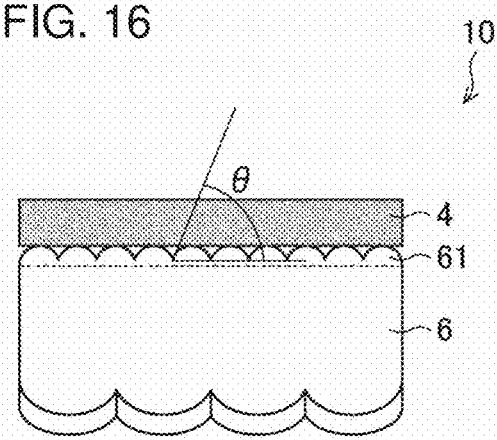
FIG. 16 is a diagram illustrating a maximum inclination angle of a diffusion pattern on a lens array in a display switching device according to a third embodiment.

FIG. 8 is a graph describing the diffusion properties of the diffusion layer in the display switching device according to the second embodiment. More specifically, FIG. 8 shows the relationship between the angle of light incident from the light sources onto the diffusion layer 3 (an angle of perpendicular incidence is defined as 0 degrees) and the light intensity. As shown in FIG. 8, light incident at 0 degrees has the highest intensity, and the light intensity weakens gradually as the angle increases. Although light incident from the front of a user is visible to the user, obliquely incident light is invisible. Thus, light from the light source positions is to enter the device from the front of the user. The edge area of the lens array 6 is less bright as viewed from the front, providing lower visibility. However, when $\theta 3$, at which an intensity is to be 10% in the diffusion properties (in FIG. 8, about 60 degrees), is greater than $\theta 1 - \theta 2$, enough visibility to the front is provided. The display switching device 10 designed as described above may allow, as viewed from the viewer, light passing through the diffusion layer 3 and the display layer 4 to enter the device from the front of the user.

The formula below may be satisfied:

$$(n2-0.2) \leq n1 \leq (n2+0.2)$$

where n1 is a refractive index of the diffusion layer 3, and n2 is a refractive index of the lens array 6. Typically, the diffusion layer 3 with a greater refractive index n1 reduces reflection of ambient light incident in the viewing direction more greatly. When the refractive index n1 is greater, the diffusion effect decreases. However, a difference of up to 0.2 reduces the diffusion effect by about 10%, which may be negligible. When the refractive index n1 of the diffusion layer 3 differs from the refractive index n2 of the lens array 6 by 0.2 or less, total reflection is prevented, and also the diffusion effect increases. Thus, the refractive index n1 of the diffusion layer 3 may fall within the range of $n2-0.2 < n1 < n2+0.2$.

The diffusion layer 3 and the lens array 6 may eliminate an adhesive layer between them, and the diffusion layer 3 may be a single layer formed from a material having diffusibility and adhesiveness to the lens array 6. For example, the diffusion layer 3 may be formed from a material having particles dispersed in transparent adhesive (e.g., diffusive transparent ink).

The lens array 6 may also include lenses shaped to collect and focus light from the light source positions on the boundary between the diffusion layer 3 and the display layer 4 or a position farther from the light source positions than the boundary. A smaller light spot formed by light from the light sources 7 on the boundary between the diffusion layer 3 and the display layer 4 may allow the display layer 4 to have less image crosstalk.

FIGS. 12A to 12C show the light spread observed when light from the light sources enters the lens array 6 in a perpendicular direction. As shown in FIG. 12A, when light from the light source positions passes through the lens array 6 and focuses beyond the boundary between the diffusion layer 3 and the display layer 4, the light spot is large at the boundary between the diffusion layer 3 and the display layer 4. As shown in FIG. 12C, when light from the light source positions passes through the lens array 6 and focuses before reaching the boundary between the diffusion layer 3 and the display layer 4, the light spot is also large at the boundary between the diffusion layer 3 and the display layer 4. As shown in FIG. 12B, with the focus of the lens array 6 on the boundary between the diffusion layer 3 and the display layer 4, the light spot is minimized on the boundary between the diffusion layer 3 and the display layer 4. The above-described structure effectively reduces image crosstalk. The boundary between the diffusion layer 3 and the display layer 4 refers to an area near the boundary between the diffusion layer 3 and the display layer 4. At a site where light from the light sources is obliquely incident on the lens array 6, the focus is nearer the light sources than the boundary between the diffusion layer 3 and the display layer 4. Thus, the lens array 6 may include lenses shaped to collect and focus light from the light source positions on the boundary between the diffusion layer 3 and the display layer 4 or a position farther from the light source positions than the boundary.

The lens array 6 may also include lenses shaped to collect and focus light from the light source positions on a position farther from the light source positions than the boundary between the lens array 6 and the diffusion layer 3. The above-described structure effectively reduces image crosstalk.

Third Embodiment

A display switching device 10 includes a lens array 6 including a diffusion pattern 61 on its surface adjacent to a display layer 4. The diffusion pattern 61 diffuses light passing through the lens array 6. For example, as shown in FIG. 13, the display layer 4 and the lens array 6 may be arranged in this order from the viewer, with the diffusion pattern 61 formed on the surface of the lens array 6 adjacent to the display layer 4.

Embodiment structures that include a diffusion layer integral with the lens array 6 reduce the likelihood that ambient light incident in the viewing direction produces Fresnel reflection. Embodiment structures eliminates separate formation of the diffusion layer, thus reducing the cost of producing the display switching device 10.

In the display switching device 10, the diffusion pattern 61 on the lens array 6 includes multiple lens shapes. In embodiment structures, the diffusion pattern 61 on the lens array 6 has a height (12 in FIG. 15) that may be 0.3 times or less the lens pitch (11 in FIG. 15) of the lenses in the lens array 6.

For the same reasons as described above with regard to the thickness of the diffusion layer 3 in the second embodiment, the height of the diffusion pattern 61 within the limits will reduce image crosstalk caused by the diffusion pattern 61 on the display layer 4.

Figure 17:
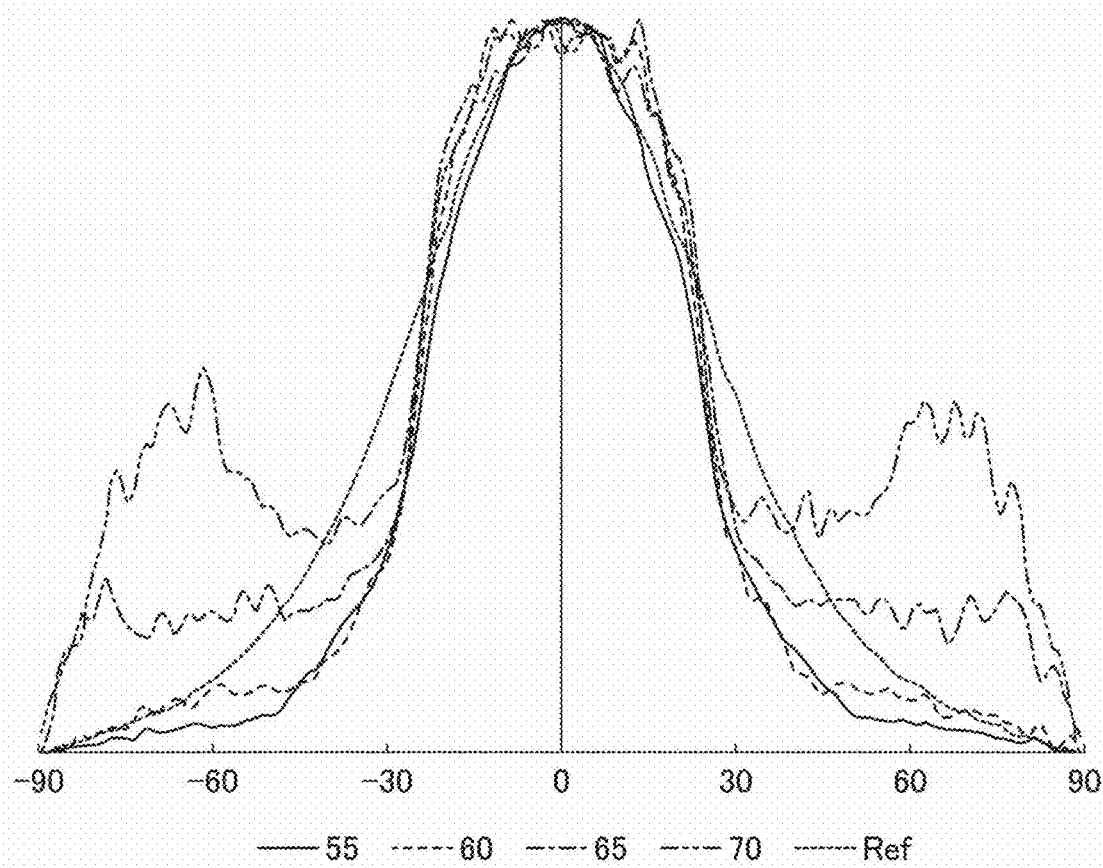
FIG. 17 is a diagram illustrating a graph of a relationship between a maximum inclination angle of a diffusion pattern and diffusion properties of a diffusion layer in a display switching device according to a third embodiment.

The diffusion pattern 61 on the lens array 6 includes multiple lens shapes. Each lens shape has a tangent to its cross-sectional profile that may form a maximum inclination angle of 60 degrees or less with the boundary surface with the display layer 4. FIG. 17 is a graph showing the relationship between the maximum inclination angle (8) of the diffusion pattern 61 and the diffusion properties of a diffusion layer 3 in the display switching device 10 according to a third embodiment. As shown in the graph of FIG. 17, the diffusion pattern 61 with a greater maximum inclination angle on the lens array 6 has a light intensity that increases again as the light incidence angle increases, unlike the trend shown in FIG. 8 of the lower light intensity at a larger light incidence angle. Thus, the diffusion layer 3 may have a high light intensity at an unexpected position on its surface. In other words, the diffusion directional range may increase. However, the diffusion directional range is to be less than the value (lens pitch×0.5) described in the second embodiment. Reducing the diffusion directional range to less than the lens pitch×0.5 may be satisfied with the diffusion pattern 61 having a maximum inclination angle of 60 degrees or less. In such a manner, the visibility to the front is achieved as viewed from the user, or the viewer.

The diffusion pattern 61 on the lens array 6 may include multiple unit shapes. The unit shapes may have at least two shapes that may be arranged at dispersed locations.

With the same shapes aligned as the diffusion pattern 61 as shown in the upper part of FIG. 14, the periods of the lens array 6 and the periods of the diffusion patterns 61 are likely to cause a Moiré pattern (a pattern of lines caused by interference) depending on the positional relationship between the same diffusion patterns aligned and the lenses in the lens array 6. In contrast, as shown in the lower part of FIG. 14, with the lens array 6 including multiple different diffusion patterns 61, the periods of the lens array 6 and the periods of the diffusion patterns 61, which differ in places, are less likely to cause a Moiré pattern. To reduce the Moiré pattern, unit shapes having at least two different shapes may be arranged at dispersed locations.

For example, the arrangement of lens shapes with different diameters at dispersed locations provides the diffusion pattern 61 including unit diffusion patterns that have at least two different shapes arranged at dispersed locations.

Fourth Embodiment

A display switching device 10 may include a pixel-surrounding region 45*b* that surrounds pixel regions 45*a* and reduces reflection or transmission of light from a position at or opposite to light sources 7. For example, as shown in FIG. 18, with a lens array 6, a display layer 4, and a diffusion layer 3 arranged in this order from the light sources 7, the pixel-surrounding region 45*b* may be in the surface of the display layer 4 adjacent to the diffusion layer 3. The pixel-surrounding region 45*b* in this structure reduces the reflection of ambient light incident in the viewing direction. In another example, as shown in FIG. 19, with a lens array 6, a diffusion layer 3, and a display layer 4 arranged in this order from the light sources 7, the pixel-surrounding region 45*b* may be in the surface of the display layer 4 adjacent to the diffusion layer 3. The pixel-surrounding region 45*b* in this structure reduces the reflection of ambient light incident in the viewing direction. The structures shown in FIGS. 18 and 19 reduce ambient light reflection to reduce the likelihood that the display layer appears white.

As shown in FIG. 20 or 21, the pixel-surrounding region 45*b* may have a reflectance of 50% or less with respect to light from a position opposite to the positions of the light sources 7 (or from the viewer). The pixel-surrounding region may have a transmittance of 50% or less with respect to light from the light source positions. In this structure, the display layer 4 reduces the reflection of light at the diffusion layer 3 to 50% or less to reduce the likelihood that the screen surface appears white with the reflection of ambient light at the surface facing the viewer (the diffusion layer 3 or the display layer 4). In another example, the transmission of light from the light sources may be reduced to reduce the likelihood that the screen surface appears white.

FIG. 22 is a diagram describing reduction of crosstalk by the pixel-surrounding region 45*b* in the display switching device 10 according to a fourth embodiment. The lens array 6, the diffusion layer 3, and the display layer 4 are arranged in this order from the light sources in the display switching device 10 shown in FIG. 22. Although the lens array 6 collects light from the light sources 7, the light is diffused again in the diffusion layer 3. However, the diffused light passes through the low-transmittance pixel-surrounding region 45*b*, and is less likely to be directed toward the viewer through the display layer 4 reducing the likelihood that the display layer appears white.

Fifth Embodiment

Figure 23:
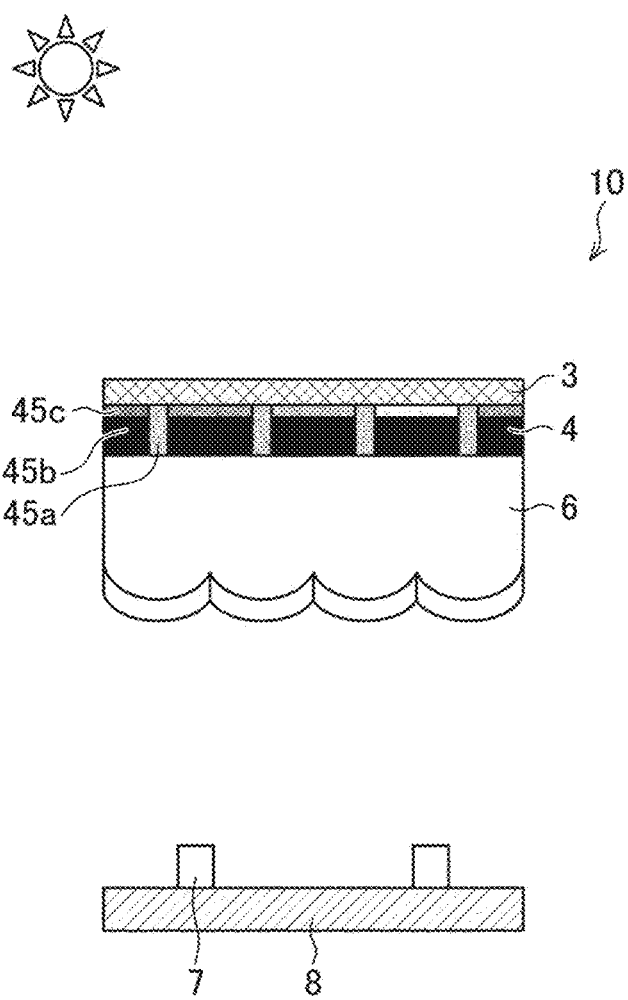
FIG. 23 is a schematic diagram illustrating a display switching device according to a fifth embodiment.

As shown in FIGS. 23 and 24, the pixel-surrounding region 45*b* in the display switching device 10 may have a colored area 45C corresponding to a pattern visible in response to light from a position opposite to the positions of the light source 7 (from the viewer's position).

Embodiment structures may allow a display visible in response to ambient light and different from the display formed by light from the light sources 7. More specifically, the structure may allow a pattern to appear on the display screen with the light source 7 turned off, while reducing the likelihood that the display screen appears white with the reflection of ambient light.

The pixel-surrounding region 45*b* in the display switching device 10 may be nearer at least the diffusion layer 3 in the thickness direction of the display layer 4. For example, as shown in FIG. 25, with the lens array 6, the display layer 4, and the diffusion layer 3 arranged in this order from the light sources 7, the pixel-surrounding region 45*b* may be in the surface of the display layer 4 adjacent to the diffusion layer 3 (the surface opposite to the light sources 7). In other examples, as shown in FIG. 26, with the lens array 6, the diffusion layer 3, and the display layer 4 arranged in this order from the light sources 7, the pixel-surrounding region 45*b* may be in the surface of the display layer 4 adjacent to the diffusion layer 3 (the surface facing the light sources 7). Embodiment structures reduce crosstalk in the display layer 4.

Figure 27:
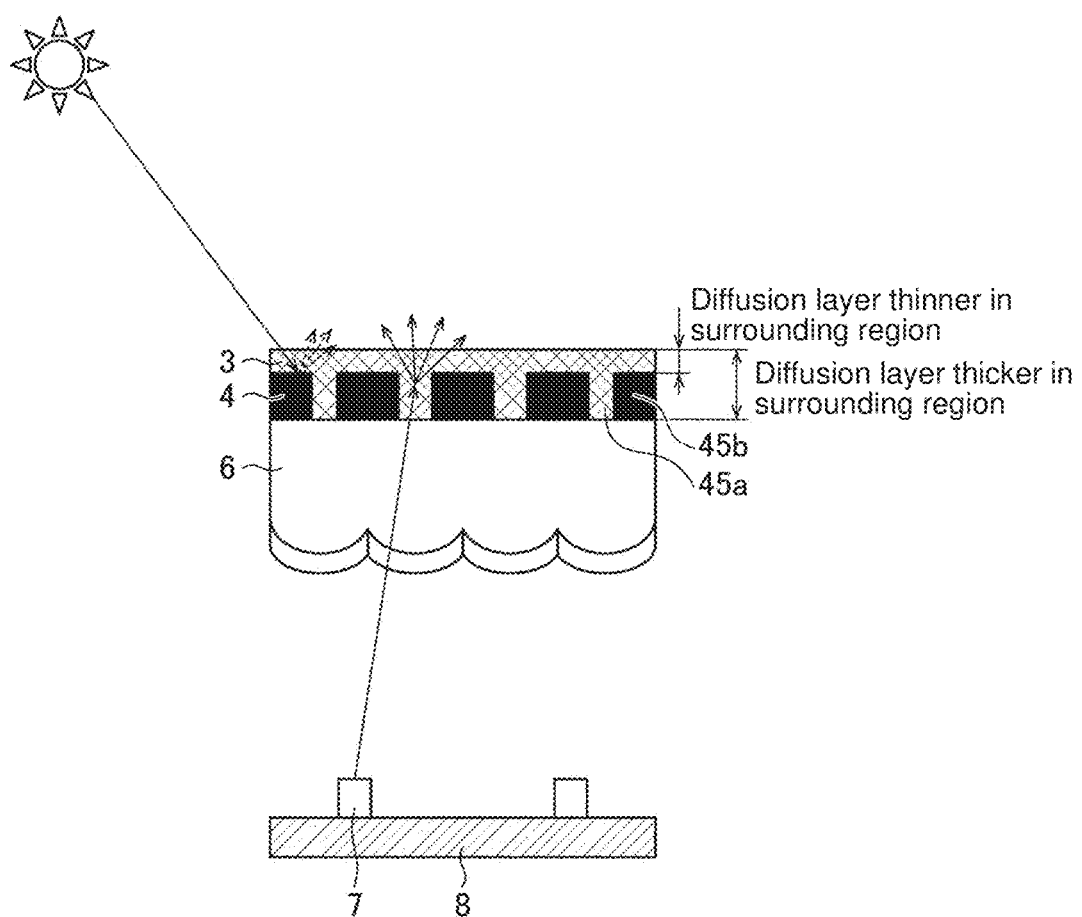
FIG. 27 is a diagram illustrating local differences in a thickness of a diffusion layer, and a diffusion of light from light sources for reducing ambient light reflection in a display switching device according to a fifth embodiment.

As shown in FIG. 27, when the diffusion layer 3 is adjacent to one of the two surfaces of the display layer 4 opposite to the light source positions, the diffusion layer 3 may be thicker in an area in contact with the pixel regions 45*a* than in an area in contact with the pixel-surrounding region 45*b*. Embodiment structures increase the light diffusibility in the pixel regions 45*a* while reducing the diffusion of reflected ambient light. As shown in FIG. 27, the pixel regions 45a in the display layer 4 may be entirely the diffusion layer 3.

Example Use of Display Switching Device 10

The display switching devices 10 described above may be used variously. Example uses include a key top on a keyboard for character entry, a switch for sensing a user operation on the display switching device 10, such as a key top on a keyboard, other switches such as a game machine switch, an elevator switch, a home appliance switch, and an on-vehicle switch, and a guide or an advertisement such as an on-vehicle display. The display switching device according to the present embodiment used for button devices on a game machine will now be described. Each button device on the game machine includes a button body and the display switching device 10 described above, and the button body is depressed into the housing of the game machine.

Figure 36:
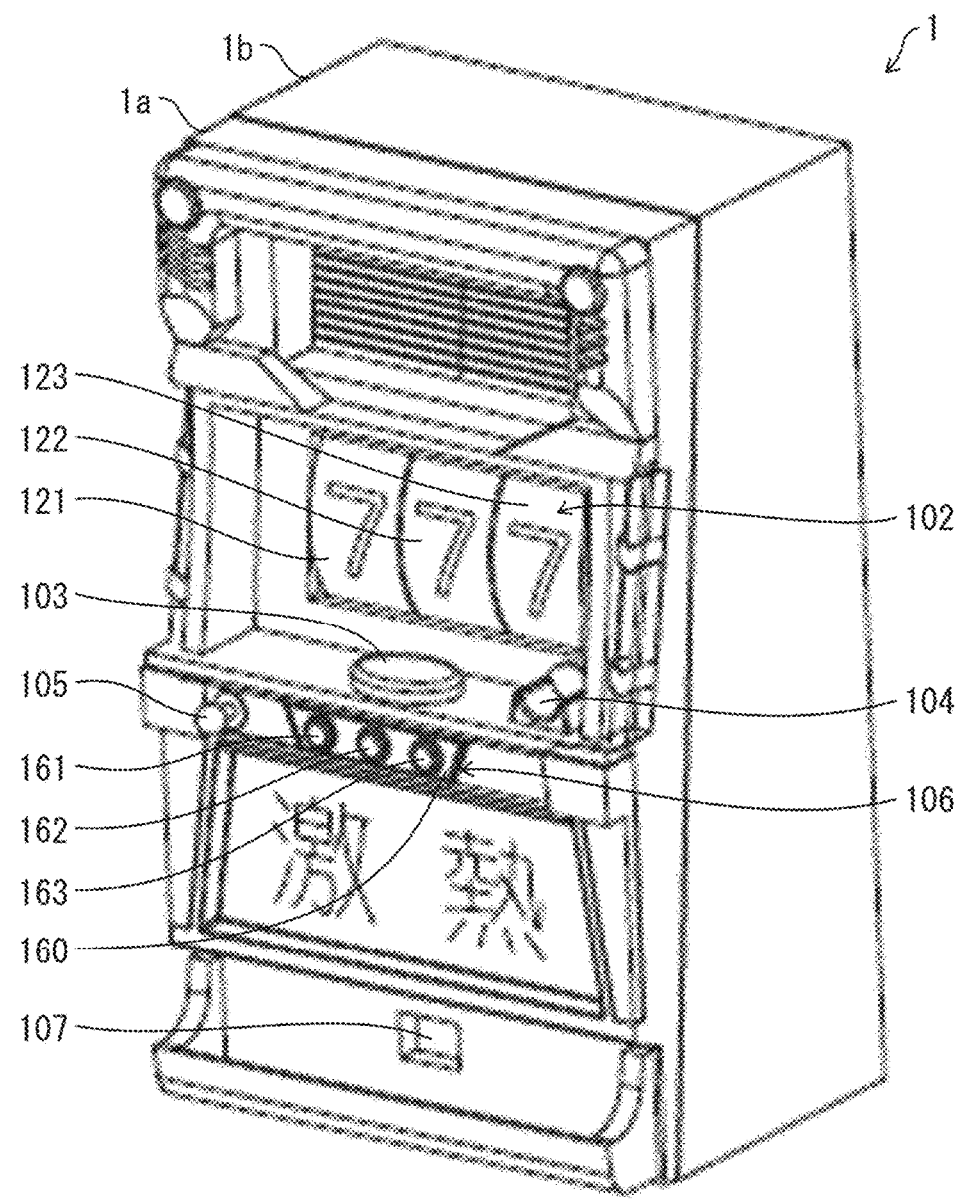
FIG. 36 is a diagram illustrating a schematic perspective view of a game machine including a display switching device according to one or more embodiments.

Referring to FIG. 36, a game machine (slot machine) 1 for which push button devices according to the present embodiment (refer to FIGS. 36 and 37) are used will now be described briefly. FIG. 36 is a schematic perspective view of the game machine 1 according to the present embodiment.

As shown in FIG. 36, the game machine 1 includes a front door 1a facing the player, and a box-shaped housing 1b to which the front door 1a operable to be open and closed is attached. The game machine 1 also includes a reel unit 102, a bet button 103, a medal slot 104, a start lever 105, a stop button unit 106, and a medal outlet 107. The position of the front door 1a is referred to as the front with respect to the game machine 1, the opposite side as the rear, the left side with respect to the front as the left, and the right side as the right.

The reel unit 102 is installed in the housing 1b adjacent to the display window at the vertical center of the front door 1a. The reel unit 102 includes three cylindrical reels 121 to 123 (a left reel 121, a middle reel 122, and a right reel 123) arranged in a right-left direction. The reels 121 to 123 spin or stop in response to an operation performed by the player. The player receives a prize in accordance with the pattern of symbols when all the reels 121 to 123 stop.

The bet button 103 is located at substantially the center of the flat panel of a console formed below the display window in the front door 1a. The medal slot 104 is located at the right on the flat panel of the console in the front door 1a. The bet button 103 is a button switch used to indicate the number of medals to bet (the number of bets) per game on the game machine 1 out of the medals put into the medal slot 104 by the player. For example, the player depresses the bet button 103 the number of times to indicate as many bets as the depressing count.

The start lever 105 is located on the left on the front surface of the console in the front door 1a. When the start lever 105 is operated, the reels 121 to 123 start spinning.

The stop button unit 106 is located at substantially the center of the front surface of the console inside the front door 1a. The stop button unit 106 is fixed on the front surface of the console by a decorative panel (front panel) 160. The stop button unit 106 includes three stop buttons 161 to 163 (a left-reel stop button 161, a middle-reel stop button 162, and a right-reel stop button 163) arranged in a right-left direction. When each of the stop buttons 161 to 163 is depressed, the corresponding one of the reels 121 to 123 stops spinning. The structure of the stop button unit 106 will be described in detail later with reference to FIG. 37.

The medal outlet 107 is located at the bottom of the front door 1a. The game machine 1 discharges medals through the medal outlet 107.

The stop buttons 161 to 163 each include multiple light sources.

When the start lever 105 is operated, a reel spin controller receives an instruction to start spinning the reels 121 to 123. The reel spin controller provides a drive pulse to a reel drive controller to spin the reels 121 to 123 at a predetermined speed. The reel drive controller spins the reels 121 to 123 based on the received drive pulse.

The reel spin controller receives, from the photo-microswitches of the stop buttons 161 to 163, signals indicating that the stop buttons 161 to 163 have been depressed. The reel spin controller then provides a drive pulse to the reel drive controller to stop the reels 121 to 123. The reel drive controller stops the reels 121 to 123 based on the received drive pulse.

Additionally, a lighting controller controls turning on and turning off of each of the light sources of the stop buttons 161 to 163.

Overview of Stop Button Unit 106

Figure 37:
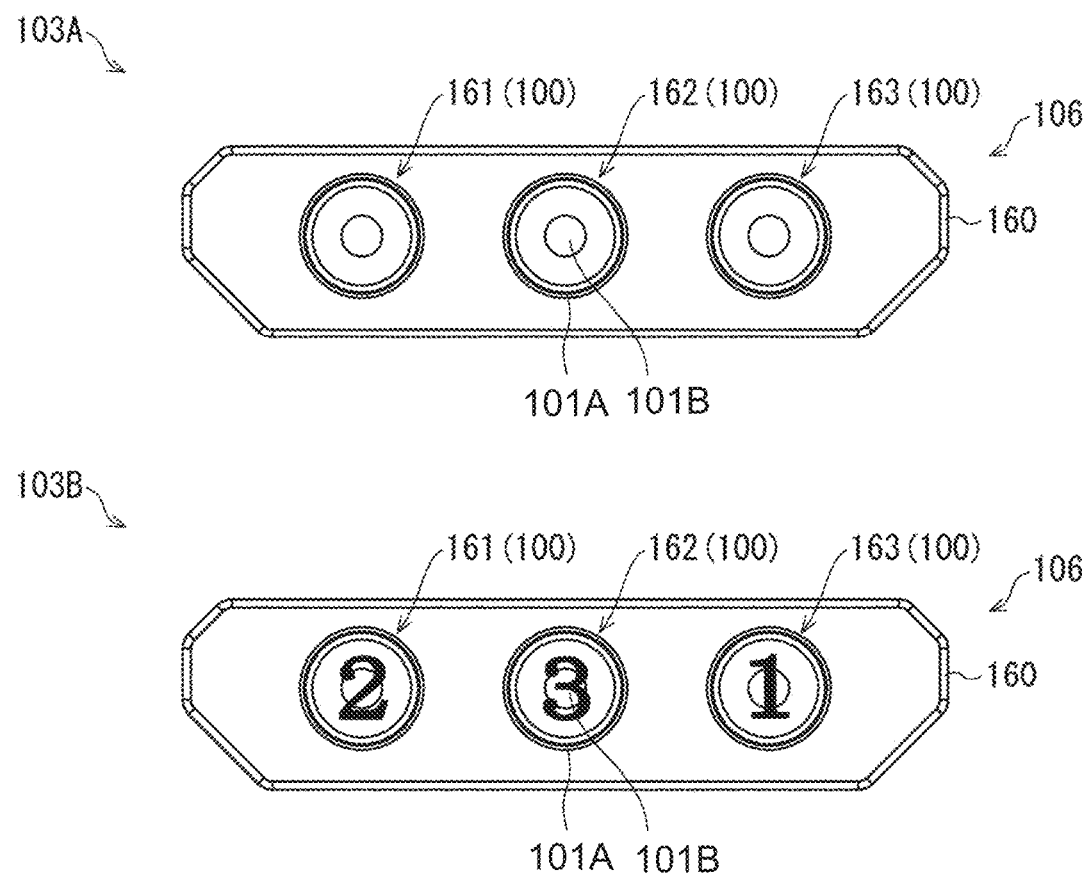
FIG. 37 is a diagram illustrating a top view of stop button units for a game machine.

The stop button unit 106 installed in the game machine 1 will now be described briefly. FIG. 37 is a schematic top view of the stop button unit 106.

As shown in FIG. 36, the stop button unit 106 includes the decorative panel 160, and three push button devices 100 as the stop buttons 161 to 163. More specifically, the stop buttons 161 to 163 are the three push button devices 100 individually installed in the stop button unit 106. The push button devices 100 will be described below, and the same may apply to all the stop buttons 161 to 163.

As shown in FIGS. 36 and 37, the decorative panel 160 has holes at the respective positions of the three push button devices 100. The push button devices 100 each include a button body (button top) 101A having a front surface to be depressed with the player's finger. The push button devices 100 each include a display area (display switch sheet) 101B that displays a predetermined display image on the rear surface of the button body 101A.

In FIG. 37, the display areas 101B display no display images in the state indicated by reference numeral 103A, and display the order of the stop buttons 161 to 163 that have been depressed in the state indicated by reference numeral 103B showing example display images. In the above-described manner, the display areas 101B may display predetermined display images for the player through the holes in the decorative panel 160.

One or more embodiments disclosed herein should not be construed to be restrictive, but may be modified while remaining within the spirit and scope of disclosed and recited embodiments of the invention. The technical features disclosed in one or more embodiments may be combined in other embodiments while remaining within the technical scope of the invention.

The invention claimed is:

1. A display switching device for switching display images by switching light illumination from a plurality of light source positions, the display switching device comprising: a lens array including a plurality of lenses configured to allow passage of light from the plurality of light source positions; a display layer including a plurality of pixel regions configured to allow passage of light collected on the plurality of lenses comprised in the lens array; and a diffusion layer located opposite to the plurality of light source positions with the lens array in between, the diffusion layer being configured to diffuse passing light, wherein the diffusion layer optically adheres to a layer adjacent to one of two surfaces of the diffusion layer nearer the plurality of light source positions, or the diffusion layer and the layer adjacent to one of two surfaces of the diffusion layer nearer the plurality of light source positions comprise a same material, and the diffusion layer has a thickness 0.3 times or less a lens pitch of the plurality of lenses comprised in the lens array when the diffusion layer has a haze of 98% or less.

2. The display switching device according to claim 1, wherein
the lens array, the diffusion layer, and the display layer are arranged in an order of the lens array, the diffusion layer, and the display layer from the plurality of light source positions.

3. The display switching device according to claim 2, wherein the relation: $\theta 3 \geq \theta 1 - \theta 2$ is satisfied, where $\theta 1$ is an angle of incidence of light from one of the plurality of light source positions entering an outermost lens of the plurality of lenses comprised in the lens array, $\theta 2$ is an angle at which a central light quantity of parallel light entering the plurality of lenses comprised in the lens array is halved, and $\theta 3$ is an angle at which an intensity is to be 10% of an intensity at an emission angle of 0 degrees in diffusion properties of the diffusion layer.

4. The display switching device according to claim 2, wherein the relation: $n2-0.2 \leq n1 \leq n2+0.2$
is satisfied, where n1 is a refractive index of the diffusion layer, and n2 is a refractive index of the lens array.

5. The display switching device according to claim 1, wherein
the diffusion layer is a single layer comprising a material having diffusibility and adhesiveness to the lens array.

6. The display switching device according to claim 1, wherein
the lens array comprises, on a surface adjacent to the display layer, a diffusion pattern for diffusing light passing through the lens array.

7. The display switching device according to claim 6, wherein
the diffusion pattern on the lens array comprises a plurality of lens shapes, and the diffusion pattern has a height 0.3 times or less a lens pitch of the plurality of lenses comprised in the lens array.

8. The display switching device according to claim 6, wherein
the diffusion pattern on the lens array comprises a plurality of lens shapes, and each of the plurality of lens shapes has a tangent to a cross-sectional profile of the lens shape forming a maximum inclination angle of 60 degrees or less with a boundary surface with the display layer.

9. The display switching device according to claim 6, wherein
the diffusion pattern on the lens array comprises a plurality of unit shapes, and the plurality of unit shapes comprise at least two different shapes arranged at dispersed locations.

10. The display switching device according to claim 2, wherein
the lens array comprises a plurality of lenses shaped to collect and focus light from the plurality of light source positions on a boundary between the diffusion layer and the display layer or a position farther from the plurality of light source positions than the boundary.

11. The display switching device according to claim 2, wherein
the lens array comprises a plurality of lenses shaped to collect and focus light from the plurality of light source positions on a position farther from the plurality of light source positions than a boundary between the lens and the diffusion layer.

12. The display switching device according to claim 1, further comprising:
a pixel-surrounding region surrounding the plurality of pixel regions and configured to reduce reflection or transmission of light from the plurality of light source positions or a position opposite to the plurality of light source positions.

13. The display switching device according to claim 12, wherein
the pixel-surrounding region has a reflectance of 50% or less with respect to light from the position opposite to the plurality of light source positions.

14. The display switching device according to claim 12, wherein
the pixel-surrounding region has a transmittance of 50% or less with respect to light from the plurality of light source positions.

15. The display switching device according to claim 12, wherein
the pixel-surrounding region has a colored area corresponding to a pattern visible with light from the position opposite to the plurality of light source positions.

16. The display switching device according to claim 12, wherein
the pixel-surrounding region is nearer at least the diffusion layer in a thickness direction of the display layer.

17. The display switching device according to claim 12, wherein
when the diffusion layer is adjacent to one of two surfaces of the display layer opposite to the plurality of light source positions, the diffusion layer is thicker in an area in contact with the plurality of pixel regions than in an area in contact with the pixel-surrounding region.

18. A button device for a game machine, the device comprising:
a button body; and
the display switching device according to claim 1,
wherein the button body is to be depressed into a housing of the game machine.

19. A switch, comprising:
the display switching device according to claim 1,
wherein the switch detects a user operation on the display switching device.

* * * * *